(12) United States Patent
Holland et al.

(10) Patent No.: US 11,877,048 B2
(45) Date of Patent: Jan. 16, 2024

(54) CAMERA INITIALIZATION FOR REDUCED LATENCY

(71) Applicant: QUALCOMM Incorporated, San Diego, CA (US)

(72) Inventors: Wesley James Holland, Encinitas, CA (US); Upal Mahbub, San Diego, CA (US); Venkata Ravi Kiran Dayana, San Diego, CA (US); Rengaraj Thirupathi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 73 days.

(21) Appl. No.: 17/412,113

(22) Filed: Aug. 25, 2021

(65) Prior Publication Data

US 2023/0062187 A1    Mar. 2, 2023

(51) Int. Cl.
| | |
|---|---|
| *H04N 23/61* | (2023.01) |
| *H04N 23/67* | (2023.01) |
| *H04N 23/65* | (2023.01) |
| *H04N 23/60* | (2023.01) |
| *G06T 7/246* | (2017.01) |
| *G06T 1/20* | (2006.01) |

(52) U.S. Cl.
CPC .............. *H04N 23/61* (2023.01); *G06T 7/246* (2017.01); *H04N 23/64* (2023.01); *H04N 23/651* (2023.01); *H04N 23/67* (2023.01); *G06T 1/20* (2013.01); *G06T 2207/20208* (2013.01)

(58) Field of Classification Search
CPC ...... H04N 23/61; H04N 23/64; H04N 23/651; H04N 23/67; H04N 23/667; H04N 23/90; H04N 23/45; G06T 7/246; G06T 1/20; G06T 2207/20208; G06V 10/40; G06V 10/764; G06V 40/10; G06V 40/20; G06V 20/35
See application file for complete search history.

(56) References Cited

U.S. PATENT DOCUMENTS

| | | | |
|---|---|---|---|
| 2015/0229889 A1 | 8/2015 | Boettiger | |
| 2020/0084387 A1* | 3/2020 | Baldwin | ................... H04N 5/33 |
| 2020/0267326 A1* | 8/2020 | Yim | ....................... H04N 23/62 |
| 2020/0396383 A1 | 12/2020 | Moloney et al. | |
| 2020/0396407 A1* | 12/2020 | Suzuki | ................... H04N 25/75 |
| 2021/0097830 A1* | 4/2021 | England | ........... G08B 13/19695 |

(Continued)

FOREIGN PATENT DOCUMENTS

| | | |
|---|---|---|
| CN | 110266950 B | 4/2021 |
| EP | 3502954 A1 | 6/2019 |
| WO | 2021102483 A2 | 5/2021 |

OTHER PUBLICATIONS

International Search Report and Written Opinion—PCT/US2022/075175—ISA/EPO—dated Dec. 16, 2022.

*Primary Examiner* — Shahbaz Nazrul
(74) *Attorney, Agent, or Firm* — QUALCOMM Incorporated

(57) ABSTRACT

Systems, methods, and non-transitory media are provided for predictive camera initialization. An example method can include obtain, from a first image capture device, image data depicting a scene; classify the scene based on the image data; based on the classification of the scene, predict a camera use event; and based on the predicted camera use event, adjust a power mode of at least one of the first image capture device and a second image capture device.

36 Claims, 8 Drawing Sheets

(56) References Cited

U.S. PATENT DOCUMENTS

2021/0127050 A1    4/2021    Gandhi et al.
2021/0152736 A1    5/2021    Sonenblick et al.
2022/0165054 A1*  5/2022    Olwal .................... H04N 7/188

* cited by examiner

CAMERA INITIALIZATION FOR REDUCED LATENCY

TECHNICAL FIELD

The present disclosure generally relates to controlling camera devices. For example, aspects of the present disclosure relate to predictive camera initialization for reduced camera use latency.

BACKGROUND

Electronic devices are increasingly equipped with camera hardware to capture images and/or videos for consumption. For example, a computing device can include a camera (e.g., a mobile device such as a mobile telephone or smartphone including one or more cameras) to allow the computing device to capture a video or image of a scene, person, object, etc. The image or video can be captured and processed by the computing device (e.g., a mobile device, IP camera, extended reality device, connected device, security system, etc.) and stored and/or output for consumption (e.g., displayed on the device and/or another device). In some cases, the image or video can be further processed for effects (e.g., compression, image enhancement, image restoration, scaling, framerate conversion, noise reduction, etc.) and/or certain applications such as computer vision, extended reality (e.g., augmented reality, virtual reality, and the like), object detection, image recognition (e.g., face recognition, object recognition, scene recognition, etc.), feature extraction, authentication, and automation, among others.

In some cases, an electronic device can process images to detect objects, faces, events, and/or any other items captured by the images. The object detection can be useful for various applications such as, for example, authentication, automation, gesture recognition, surveillance, extended reality, computer vision, among others. In some examples, the electronic device can implement a lower-power or "always-on" (AON) camera that persistently or periodically operates to automatically detect certain objects in an environment. The lower-power camera can be implemented for a variety of use cases such as, for example, persistent gesture detection, persistent object (e.g., face/person, animal, vehicle, device, plane, event, etc.) detection, persistent object scanning (e.g., quick response (QR) code scanning, barcode scanning, etc.), persistent facial recognition for authentication, etc. In many cases, the imaging, processing, and/or performance capabilities/results of the lower-power camera can be limited. Accordingly, in some cases, the electronic device may also implement a higher-power camera with higher imaging, processing, and/or performance capabilities/results, which the electronic device may use at certain times and/or in certain scenarios when higher imaging, processing, and/or performance capabilities/results are desired.

BRIEF SUMMARY

Systems and techniques are described herein for predictive camera initialization for reduced latency. According to at least one example, a method is provided for predictive camera initialization for reduced latency. The method can include obtaining, from a first image capture device, image data depicting a scene; classifying the scene based on the image data; based on the classification of the scene, predicting a camera use event; and based on the predicted camera use event, adjusting a power mode of at least one of the first image capture device and a second image capture device.

According to at least one example, a non-transitory computer-readable medium is provided for predictive camera initialization for reduced latency. The non-transitory computer-readable medium can include instructions which, when executed by one or more processors, cause the one or more processors to obtain, from a first image capture device, image data depicting a scene; classify the scene based on the image data; based on the classification of the scene, predict a camera use event; and based on the predicted camera use event, adjust a power mode of at least one of the first image capture device and a second image capture device.

According to at least one example, an apparatus is provided for predictive camera initialization for reduced latency. The apparatus can include memory and one or more processors configured to obtain, from a first image capture device, image data depicting a scene; classify the scene based on the image data; based on the classification of the scene, predict a camera use event; and based on the predicted camera use event, adjust a power mode of at least one of the first image capture device and a second image capture device.

According to at least one example, another apparatus is provided for predictive camera initialization for reduced latency. The apparatus can means for obtaining, from a first image capture device, image data depicting a scene; classifying the scene based on the image data; based on the classification of the scene, predicting a camera use event; and based on the predicted camera use event, adjusting a power mode of at least one of the first image capture device and a second image capture device.

In some aspects, the method, non-transitory computer-readable medium, and apparatuses described above can pre-converge, based on one or more images from the first image capture device, an exposure value and/or a focus value.

In some aspects, the method, non-transitory computer-readable medium, and apparatuses described above can obtain at least one of location data indicating a location of an electronic device associated with the first image capture device and sensor data from one or more sensors associated with the electronic device, the sensor data including at least one of a motion measurement indicating motion associated with the electronic device, audio data captured by the one or more sensors, and position measurements indicating a position of the electronic device; and classify the scene based on the image data and at least one of the location data, the audio data, and the sensor data In some examples, the predicted camera use event can include a user input configured to trigger an electronic device associated with the first image capture device to capture additional image data.

In some examples, adjusting the power mode of at least one of the first image capture device and the second image capture device can include initializing the second image capture device. In some examples, the second image capture device is initialized in a power mode that consumes more power than a respective power mode of the first image capture device used to capture the image data.

In some aspects, the method, non-transitory computer-readable medium, and apparatuses described above can capture additional image data using the second image capture device in the power mode that consumes more power than the respective power mode of the first image capture device. In some examples, the power mode includes at least one of a higher resolution than a resolution associated with the respective power mode of the first image capture device used to capture the image data, a higher framerate than a framerate associated with the respective power mode of the first image capture device used to capture the image data, a higher number of image sensors than a number of image sensors associated with the respective power mode of the first image capture device used to capture the image data, and a first image sensor that supports a particular power mode that consumes more power than a different power mode supported by the second image sensor associated with the first image capture device.

In some cases, the second image capture device is associated with a first camera pipeline that consumes more power than a second camera pipeline associated with the first image capture device. In some examples, the first camera pipeline includes at least one of more image processing capabilities than the second camera pipeline and one or more hardware components having a higher processing performance than the second camera pipeline.

In some examples, initializing the second image capture device includes increasing the power mode of the second image capture device.

In some examples, initializing the second image capture device includes increasing the power mode of the second image capture device. In some cases, increasing the power mode of the second image capture device includes at least one of increasing a power of at least one of the second image capture device and one or more hardware components associated with a camera pipeline of the second image capture device.

In some aspects, the method, non-transitory computer-readable medium, and apparatuses described above can store the image data from the first image capture device in a buffer, wherein at least a portion of the image data is stored in the buffer at least one of during the initializing of the second image capture device and before the initializing of the second image capture device completes; and process, via a camera pipeline associated with the second image capture device, at least the portion of the image data stored in the buffer, wherein the at least the portion of the image data is processed after the second image capture device is initialized.

In some examples, adjusting the power mode of at least one of the first image capture device and the second image capture device includes increasing a frequency of at least one of a processor associated with a camera pipeline of the second image capture device and a memory associated with the camera pipeline.

In some cases, adjusting the power mode of at least one of the first image capture device and the second image capture device includes pre-allocating memory to a camera application associated with the second image capture device.

In some examples, classifying the scene includes detecting an event associated with the image data. In some cases, the event includes at least one of the scene depicted in the image data, a particular movement of an electronic device associated with the first image capture device, a position of the electronic device relative to a user associated with the electronic device, a crowd of people detected in the image data, a gesture associated with one or more users, a pattern displayed on an object, and a position of a group of people relative to each other.

In some examples, adjusting the power mode of at least one of the first image capture device and the second image capture device includes determining one or more initialization settings associated with an initialization of the second image capture device, the one or more initialization settings being based on a type of event associated with the scene; and initializing the second image capture device according to the one or more initialization settings.

In some aspects, the method, non-transitory computer-readable medium, and apparatuses described above can initialize, in response to classifying the scene, a timer associated with an expiration value; determine that a value of the timer reached the expiration value prior to an occurrence of the predicted camera use event; and based on the value of the timer reaching the expiration value prior to the occurrence of the predicted camera use event, reduce the power mode of the second image capture device. In some examples, reducing the power mode includes at least one of turning off the second image capture device and reducing one or more power settings associated with at least one of the second image capture device and a camera pipeline associated with the second image capture device.

In some examples, adjusting the power mode of the second image capture device includes turning on or implementing at least one of a flood illuminator, a depth sensor device, a dual image capture device system, a structured light system, a time-of-flight system, an audio algorithm, a location service, and a different camera pipeline than a camera pipeline associated with the first image capture device.

In some examples, adjusting the power mode of at least one of the first image capture device and the second image capture device includes decreasing the power mode of the first image capture device. In some cases, decreasing the power mode of the first image capture device includes at least one of decreasing a power of at least one of the first image capture device and one or more hardware components associated with a camera pipeline of the first image capture device.

In some examples, adjusting the power mode of at least one of the first image capture device and the second image capture device includes increasing the power mode of the first image capture device. In some cases, increasing the power mode of the first image capture device includes at least one of increasing a power of at least one of the first image capture device and one or more hardware components associated with a camera pipeline of the first image capture device.

In some aspects, each of the apparatuses described above is, can be part of, or can include a mobile, device, a smart or connected device, a camera system, and/or an extended reality (XR) device (e.g., a virtual reality (VR) device, an augmented reality (AR) device, or a mixed reality (MR) device). In some examples, the apparatuses can include or be part of a vehicle, a mobile device (e.g., a mobile telephone or so-called "smart phone" or other mobile device), a wearable device, a personal computer, a laptop computer, a tablet computer, a server computer, a robotics device or system, an aviation system, or other device. In some aspects, the apparatus includes an image sensor (e.g., a camera) or multiple image sensors (e.g., multiple cameras) for capturing one or more images. In some aspects, the apparatus includes one or more displays for displaying one or more images, notifications, and/or other displayable data. In some aspects, the apparatus includes one or more speakers, one or more light-emitting devices, and/or one or more microphones. In some aspects, the apparatuses described above can include one or more sensors. In some cases, the one or more sensors can be used for determining a location of the apparatuses, a state of the apparatuses (e.g., a tracking state, an operating state, a temperature, a humidity level, and/or other state), and/or for other purposes.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative examples of the present application are described in detail below with reference to the following figures.

DETAILED DESCRIPTION

Figure 1:
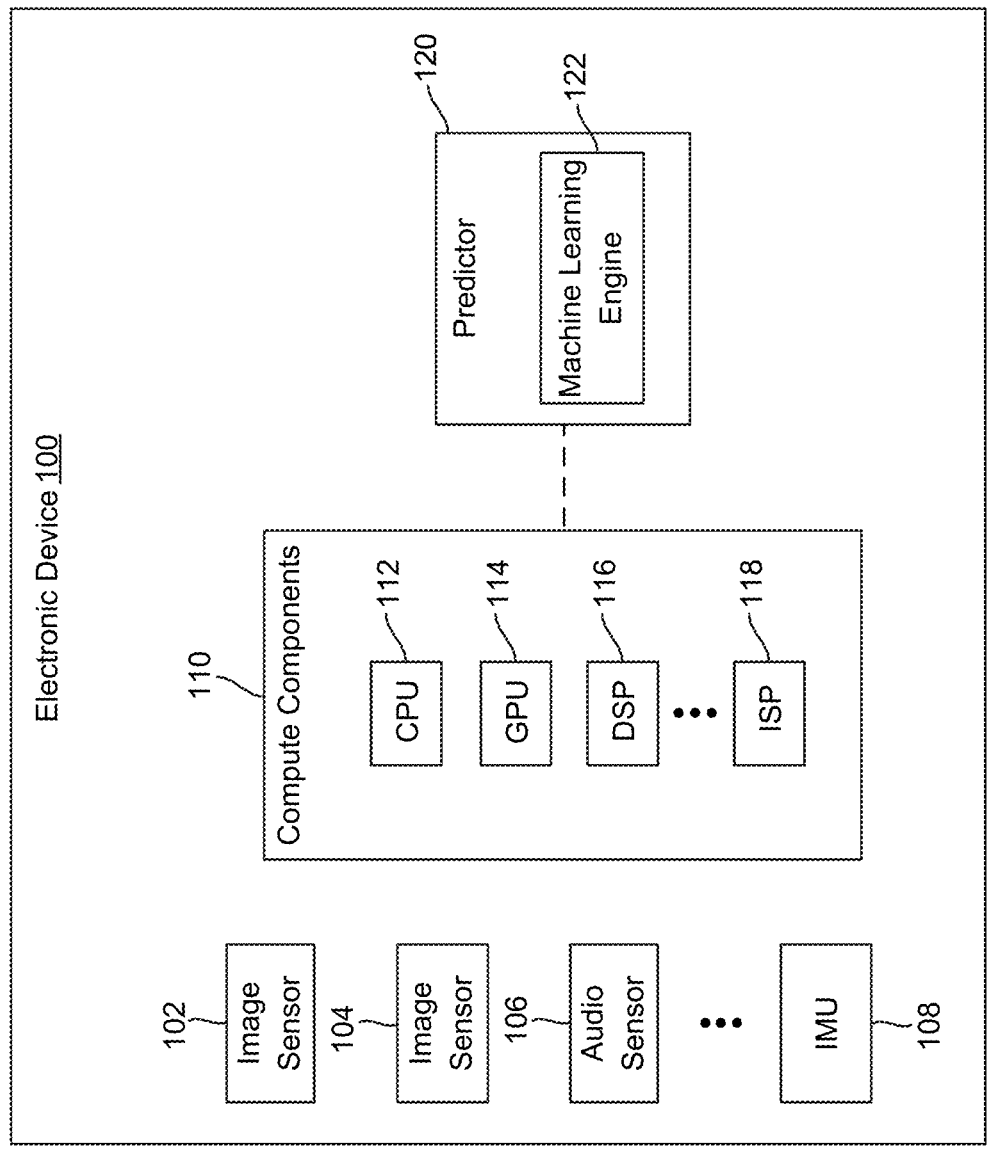
FIG. 1 is a diagram illustrating an example of an electronic device that can implement predictive camera initialization, in accordance with some examples of the present disclosure.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides example embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

Electronic devices (e.g., mobile phones, wearable devices (e.g., smart watches, smart bracelets, smart glasses, etc.), tablet computers, extended reality (XR) devices (e.g., virtual reality (VR) devices, augmented reality (AR) devices, and the like), connected devices, laptop computers, etc.) can implement cameras to detect and/or recognize events of interest. For example, electronic devices can implement lower-power cameras to detect and/or recognize events of interest on demand, an on-going or periodic basis, etc. Example events of interest can include gestures (e.g., hand gestures, smiles, etc.), an action (e.g., by a device, person, and/or animal), a presence or occurrence of one or more objects, etc. An object associated with an event of interest can include and/or refer to, for example and without limitation, a face, a code (e.g., a quick response (QR) code, a barcode, etc.), a document, a scene or environment, a link, a machine-readable code, a crowd, etc. The lower-power cameras can implement lower-power hardware and/or energy efficient image processing software/pipelines used to capture image data, detect events of interest, etc. The lower-power cameras can remain on or "wake up" to watch movement and/or objects in a scene and detect events in the scene while using less battery power than other devices such as higher-power cameras.

For example, a lower-power camera can watch movement and/or activity in a scene to discover objects. To illustrate, an XR device can implement a lower-power camera that periodically discovers an XR controller and/or other tracked objects, a mobile phone can implement a lower-power camera that periodically checks for an object (e.g., a code, document, face, etc.) or an event, a smart home assistant can implement a lower-power camera that periodically checks for a user presence, etc. Upon discovering an event (e.g., an object, a gesture, an activity, a scene, etc.), the lower-power camera can trigger one or more actions such as, for example, object detection, object recognition, authentication (e.g., facial authentication, etc.), one or more image processing tasks, among other actions. In some cases, the lower-power cameras can "wake up" other devices and/or components such as other cameras, sensors, processing hardware, etc.

In some examples, a lower-power camera (sometimes referred to as an "always-on" (AON) camera) can persistently or periodically operates to automatically detect certain objects/events in an environment. Moreover, the lower-power camera can be configured to draw a lower amount of power and compute resources than a higher-power or "main" camera. For example, lower-power camera pipelines can employ a lower/reduced resolution, a lower-power image sensor, lower-power memory resources (e.g., on-chip static random-access memory (SRAM) as opposed to dynamic random-access memory (DRAM), etc.), island voltage rails to reduce leakage, ring oscillators for clock sources (e.g., as opposed to phase-locked loops), lower-power physical interfaces, lower-power image processing operations, etc., to enable persistent or periodic imaging with limited/reduced power consumption as compared to higher-power or "main" camera pipelines. In some cases, to further reduce power consumption and/or resource utilization, lower-power camera pipelines may not implement certain operations (e.g., noise reduction, image warping, image enhancement, etc.), may not process certain types of data (e.g., color image data as opposed to mono/luma data), may not employ certain hardware (e.g., downscalers, color converters, lens distortion correction hardware, digital signal processors, neural processors, neural network accelerators, higher-power physical interfaces such as a mobile industry processor interface (MIPI) camera serial interface (CSI), certain computer vision blocks, etc.).

Generally, the imaging, processing, and/or performance capabilities and results of the lower-power camera can be lower than those of a higher-power camera. For example, lower-power cameras may produce lower quality images/videos than higher-power cameras and/or may provide more limited features and/or effects than higher-power cameras. Accordingly, in some cases, in addition to implementing a lower-power camera, an electronic device may also implement a higher-power camera that supports higher imaging, processing, and/or performance capabilities/results than the lower-power camera. In some examples, the electronic device may use such higher-power camera at certain times and/or in certain scenarios when higher imaging, processing, and/or performance capabilities/results are desired.

In many cases, it can be desirable for the higher-power camera and/or a camera application associated with the higher-power camera to be available as soon as possible when a user attempts to obtain an image, video, or preview. However, maintaining a higher-power camera in an initialized state (e.g., a ready state, a powered-on state, etc.) draws a significant amount of power and compute resources. To reduce power consumption and resource utilization, the higher-power camera is generally maintained in an off or de-initialized state. This can delay the availability and initial operation of the higher-power camera and/or the camera application when a user attempts to use the higher-power camera and/or the camera application. For example, initialization of the higher-power camera can take a certain amount of time to allocate memory for the camera application, power on/up the image sensor of the higher-power camera, power on/up various hardware blocks associated with the higher-power camera and/or a camera pipeline of the higher-power camera, converge exposure and/or focus values, etc. These processes lead to camera initialization/startup latency and user frustration in not being able to immediately capture an image/video of interest. In some cases, these processes can even lead to missed opportunities when attempting to capture short-lived events.

Systems, apparatuses, methods (also referred to as processes), and computer-readable media (collectively referred to herein as "systems and techniques") are described herein for predictive camera initialization for reduced latency. In some examples, the systems and techniques described herein can implement a predictor engine that predictively initializes a higher-power camera prior to an estimated/anticipated higher-power camera use event, such as a predicted user attempt/input to use the higher-power camera and/or the camera application. In some examples, the predictor engine can trigger an initialization of the higher-power camera based on certain events/stimuli at least partially observed by the lower-power camera and estimated to indicate a future/imminent camera use event, such as a scene, condition, and/or activity known and/or estimated to often occur before a user attempt (e.g., a user input) to capture an image/video.

For example, in some cases, a lower-power camera may observe a group of people gathering and/or smiling. A classifier associated with the predictor can use image data captured by the lower-power camera to determine a likelihood that the user may invoke the higher-power camera to capture an image/video of the group. As another example, the lower-power camera can output images for the classifier indicating a commonly photographed scene (e.g., a sunset, beach, animal, landmark, etc.) or event (e.g., a concert, a user activity, a gesture (e.g., a camera snap, a pose of the electronic device relative to a horizon, a pose of one or more users relative to the electronic device, a hand gesture, etc.), a game, a wedding, etc.). The predictor can then trigger initialization of the higher-power camera based on a prediction output from the classifier. In some cases, the predictor's decision to trigger the initialization of the higher-power camera can be further based on other data such as, for example, other sensor data (e.g., inertial sensor data, audio data, etc.), global navigation satellite system (GNSS) or global positioning system (GPS) data, etc.

In some cases, the predictor can also use data from the lower-power camera to determine a length of time available/utilized for the initialization of the higher-power camera. For example, if the predictor determines that a group of people is likely preparing to take a group image, the predictor may determine that more time may be available to initialize the higher-power camera before the group image (e.g., as compared to another image event such as a sports image or selfie) as the group may take longer to assemble (e.g., as compared to another image event). The predictor may determine that the additional time may allow for a longer exposure and/or focus convergence to optimize the image. Based on the additional time, the predictor may trigger a camera pipeline associated with the lower-power camera or the higher-power camera to converge or pre-converge an auto exposure value and/or a focus value.

In some examples, the predictor can determine the initialization steps and/or camera process it triggers based on data from the lower-power camera. For example, the predictor can trigger a high-dynamic range (HDR) mode exposure control when data from the lower-power camera captures a sunset, and a non-HDR mode when the data from the lower-power camera does not capture a sunset. As another example, the predictor can allocate a larger buffer when the data from the lower-power camera captures a user smile than when the data captures a quick response (QR) code. In some cases, in addition to triggering a higher-power camera initialization, the predictor can trigger the lower-power camera pipeline to store raw data from the lower-power camera in a buffer for the higher-power camera to process once the higher-power camera is initialized. In some examples, the raw data can include data captured by the lower-power camera while the higher-power camera is being initialized. In some examples, the higher-power camera can use the raw data in the buffer to achieve zero shutter lag (ZSL), in which case the buffer can act as a ZSL buffer.

In some cases, the predictor can use certain criteria to determine when to de-initialize the higher-power camera and/or limit higher-power camera initialization, in order to reduce the amount of time the higher-power camera remains initialized and the amount of power and resource consumption by the higher-power camera. For example, the predictor can de-initialize the higher-power camera after a preset period of time if no images/videos are captured by the higher-power camera within the period of time. As another example, the predictor can set a maximum number of initializations allowed within a preset period of time, and skip a new higher-power camera initialization if the maximum number of initializations has been reached within the preset period of time.

The systems and techniques described herein can be implemented for a variety of electronic devices to intelligently power up/down different camera sensors with minimal or reduced latency, channel sensor feeds to a lower number of processing devices such as image signal processors, etc. For example, the systems and techniques described herein can be implement for mobile computing devices (e.g., smart phones, tablets, laptops, cameras, etc.), smart wearable devices (e.g., head-mounted displays, extended reality (e.g., virtual reality, augmented reality, etc.) glasses, etc.), connected devices or Internet-of-Things (IoT) devices (e.g., smart televisions, smart security cameras, smart appliances, etc.), autonomous robotic devices, autonomous driving systems, and/or any other device with camera hardware.

The electronic device (and/or the lower-power camera on the electronic device) can monitor (and implement the systems and techniques described herein for) various types of events. Non-limiting examples of detection events can include face detection, scene detection (e.g., sunsets, document scanning, landmarks, etc.), human group detection, animal/pet detection, pattern detection (e.g., QR code, barcode, etc.), text detection, object detection, gesture detection (e.g., smile detection, emotion detection, hand waving, etc.), pose detection, etc.

Various aspects of the application will be described with respect to the figures.

FIG. 1 is a diagram illustrating an example of an electronic device 100 that can implement the predictive camera initialization (e.g., camera pre-initialization) and other techniques described herein. In some examples, the electronic device 100 can include an electronic device configured to provide one or more functionalities such as, for example, imaging functionalities, extended reality (XR) functionalities (e.g., localization/tracking, detection, classification, mapping, content rendering, etc.), video functionalities, image processing functionalities, device management and/or control functionalities, gaming functionalities, autonomous driving or navigation functionalities, computer vision functionalities, robotic functions, automation, computer vision, electronic communication functionalities (e.g., audio/video calling, electronic messaging, etc.), web browsing functionalities, etc.

For example, in some cases, the electronic device 100 can be an XR device (e.g., a head-mounted display, a heads-up display device, smart glasses, etc.) configured to provide XR functionalities, and perform predictive camera initialization. In some cases, the electronic device 100 can implement one or more applications such as, for example and without limitation, an XR application, a camera application, an application for managing and/or controlling components and/or operations of the electronic device 100, a smart home application, a video game application, a device control application, an autonomous driving application, a navigation application, a productivity application, a social media application, a communications application, a modeling application, a media application, an electronic commerce application, a browser application, a design application, a map application, and/or any other application. As another example, the electronic device 100 can be a smart phone configured to perform predictive camera initialization as described herein.

In the illustrative example shown in FIG. 1, the electronic device 100 can include one or more image sensors, such as image sensor 102 and image sensor 104, an audio sensor 106 (e.g., an ultrasonic sensor, a microphone, etc.), an inertial measurement unit (IMU) 108, and one or more compute components 110. In some cases, the electronic device 100 can optionally include one or more other/additional sensors such as, for example and without limitation, a radar, a light detection and ranging (LIDAR) sensor, a touch sensor, a pressure sensor (e.g., a barometric air pressure sensor and/or any other pressure sensor), a gyroscope, an accelerometer, a magnetometer, and/or any other sensor. In some examples, the electronic device 100 can include additional components such as, for example, a light-emitting diode (LED) device, a storage device, a cache, a GNSS/GPS receiver, a communications interface, a display, a memory device, etc. An example architecture and example hardware components that can be implemented by the electronic device 100 are further described below with respect to FIG. 7.

The electronic device 100 can be part of, or implemented by, a single computing device or multiple computing devices. In some examples, the electronic device 100 can be part of an electronic device (or devices) such as a camera system (e.g., a digital camera, an IP camera, a video camera, a security camera, etc.), a telephone system (e.g., a smartphone, a cellular telephone, a conferencing system, etc.), a laptop or notebook computer, a tablet computer, a set-top box, a smart television, a display device, a gaming console, an XR device such as an HMD, a drone, a computer in a vehicle, an IoT (Internet-of-Things) device, a smart wearable device, or any other suitable electronic device(s).

In some implementations, the image sensor 102, the image sensor 104, the audio sensor 106, the IMU 108, and/or the one or more compute components 110 can be part of the same computing device. For example, in some cases, the image sensor 102, the image sensor 104, the audio sensor 106, the IMU 108, and/or the one or more compute components 110 can be integrated with or into a camera system, a smartphone, a laptop, a tablet computer, a smart wearable device, an XR device such as an HMD, an IoT device, a gaming system, and/or any other computing device. In other implementations, the image sensor 102, the image sensor 104, the audio sensor 106, the IMU 108, and/or the one or more compute components 110 can be part of, or implemented by, two or more separate computing devices.

The one or more compute components 110 of the electronic device 100 can include, for example and without limitation, a central processing unit (CPU) 112, a graphics processing unit (GPU) 114, a digital signal processor (DSP) 116, and/or an image signal processor (ISP) 118. In some examples, the electronic device 100 can include other processors such as, for example, a computer vision (CV) processor, a neural network processor (NNP), an application-specific integrated circuit (ASIC), a field-programmable gate array (FPGA), etc. The electronic device 100 can use the one or more compute components 110 to perform various computing operations such as, for example, extended reality operations (e.g., tracking, localization, object detection, classification, pose estimation, mapping, content anchoring, content rendering, etc.), device control operations, image/video processing, graphics rendering, machine learning, data processing, modeling, calculations, computer vision, messaging, and/or any other operations.

In some cases, the one or more compute components 110 can include other electronic circuits or hardware, computer software, firmware, or any combination thereof, to perform any of the various operations described herein. In some examples, the one or more compute components 110 can include more or less compute components than those shown in FIG. 1. Moreover, the CPU 112, the GPU 114, the DSP 116, and the ISP 118 are merely illustrative examples of compute components provided for explanation purposes.

The image sensor 102 and/or the image sensor 104 can include any image and/or video sensor or capturing device, such as a digital camera sensor, a video camera sensor, a smartphone camera sensor, an image/video capture device on an electronic apparatus such as a television or computer, a camera, etc. In some cases, the image sensor 102 and/or the image sensor 104 can be part of a camera or computing device such as a digital camera, a video camera, an IP camera, a smartphone, a smart television, a game system, etc. Moreover, in some cases, the image sensor 102 and the image sensor 104 can include multiple image sensors, such as rear and front sensor devices, and can be part of a dual-camera or other multi-camera assembly (e.g., including two camera, three cameras, four cameras, or other number of cameras).

In some examples, the image sensor 102 can include or can be part of a lower-power camera or "always on" camera, and the image sensor 104 can include or can be part of a higher-power or "main" camera. In some examples, the lower-power camera can implement lower-power hardware and/or more energy efficient image processing software (than the higher-power camera) to detect events, process captured image data, etc. In some cases, the lower-power camera can implement lower power settings and/or modes than the higher-power camera (e.g., image sensor 104) such as, for example, a lower framerate, a lower resolution, a smaller number of image sensors, a lower-power mode, a lower-power camera pipeline (including software and/or hardware), etc. In some examples, the lower-power camera can implement less and/or lower-power image sensors than a higher-power camera, can use lower-power memory such as on-chip static random-access memory (SRAM) rather than dynamic random-access memory (DRAM), can use island voltage rails to reduce leakage, can use ring oscillators as clock sources rather than phased-locked loops (PLLs), and/or other lower-power processing hardware/components. In some examples, the lower-power camera may not handle higher-power and/or complexity sensor technologies (e.g., phase detection auto-focus, dual photodiode (2PD) pixels, red-green-blue-clear (RGBC) color sensing, etc.) and/or data (e.g., mono/luma data rather than full color image data).

In some cases, the lower-power camera can remain on or "wake up" to watch movement and/or events in a scene and/or detect events in the scene while using less battery power than other devices such as higher power/resolution cameras. For example, a lower-power camera can persistently watch or wake up to watch movement and/or activity in a scene to discover objects in the scene. In some cases, upon discovering an event, the lower-power camera can trigger one or more actions such as, for example, object detection, object recognition, facial authentication, image processing tasks, among other actions. In some cases, the low-power cameras can also "wake up" other devices such as other sensors, processing hardware, etc.

In some examples, each image sensor (e.g., image sensor 102, image sensor 104) can capture image data and generate frames based on the image data and/or provide the image data or frames to the one or more compute components 110 for processing. A frame can include a video frame of a video sequence or a still image. A frame can include a pixel array representing a scene. For example, a frame can be a red-green-blue (RGB) frame having red, green, and blue color components per pixel; a luma, chroma-red, chroma-blue (YCbCr) frame having a luma component and two chroma (color) components (chroma-red and chroma-blue) per pixel; or any other suitable type of color or monochrome picture.

In some examples, the one or more compute components 110 can perform image/video processing, predictive camera initialization, XR processing, device management/control, and/or other operations as described herein using data from the image sensor 102, the image sensor 104, the audio sensor 106, the IMU 108, and/or any other sensors and/or component. For example, in some cases, the one or more compute components 110 can perform predictive camera initialization, device control/management, tracking, localization, object detection, object classification, pose estimation, shape estimation, scene mapping, content anchoring, content rendering, image processing, modeling, content generation, gesture detection, gesture recognition, and/or other operations based on data from the image sensor 102, the image sensor 104, the audio sensor 106, the IMU 108, and/or any other component.

In some examples, the one or more compute components 110 can implement one or more software engines and/or algorithms such as, for example, a predictor 120 as described herein. In some cases, the one or more compute components 110 can implement one or more additional components and/or algorithms such as a machine learning model(s), a computer vision algorithm(s), a neural network(s), and/or any other algorithm and/or component. For example, in some cases, the predictor 120 implemented by the one or more compute components 110 can implement a machine learning engine 122.

In some examples, the predictor 120 can predict a camera event (e.g., a user input to capture an image/video, a user input to use a camera application, a user input to trigger a camera preview, etc.) based on sensor data from the image sensor 102 and optionally the audio sensor 106, the IMU 108, and/or any other component. The predictor 120 can then trigger a predictive initialization (e.g., a pre-initialization) of a higher-power camera (e.g., image sensor 104) and/or a higher-power camera pipeline, before the predicted camera event occurs. In some examples, the predictive camera initialization can reduce a latency/delay between the time a user input to capture an image/video and/or access a camera application/preview, and the capture of the image/video and/or the access of the camera application/preview.

In some cases, the predictor 120 can trigger a number of predictive initialization steps in response to predicting a camera event. For example, the predictor 120 can burst a CPU (e.g., CPU 112) and/or memory to a higher frequency to reduce a latency of the camera initialization and/or the camera pipeline. As another example, the predictor 120 can pre-allocate memory for a camera application, trigger a lower-resolution data capture by the image sensor 102 to pre-converge an exposure value and/or a focus value, etc. In some cases, the predictor 120 can power on the image sensor 104 and/or certain hardware and/or software blocks for camera processing such as, for example and without limitation, a higher-power physical interface (e.g., MIPI CSI, etc.), PLLs to generate clocks, on-chip infrastructure, a downscaler, a color converter, a DSP (e.g., DSP 116), an ISP (e.g., ISP 118), a neural network accelerator, a neural processor, one or more blocks for computer vision (e.g., feature extraction, feature description, object detection, recognition, etc.), image warping, noise reduction, PDAF, 2PD pixels, RGBC color sensing, HDR, etc. In some cases, the predictor 120 can modulate one or more settings as part of the predictive initialization such as, for example and without limitation, increase/decrease a resolution, increase/decrease a framerate, increase/decrease a buffer size pre-allocation, invoke more/less image sensors, increase/decrease a power mode, etc.

In some cases, the predictor 120 can extract/detect visual features from one or more frames obtained by a camera device, such as a lower-power camera device (e.g., image sensor 102). In some examples, the predictor 120 can implement a detector and/or algorithm to extract the visual features such as, for example and without limitation, a scale-invariant feature transform (SIFT), speeded up robust features (SURF), Oriented FAST and rotated BRIEF (ORB), and/or any other detector/algorithm.

In some cases, the predictor 120 can implement the machine learning engine 122 to generate machine learning classifications used to predict camera events. The machine learning engine 122 can generate classifications based on data from the image sensor 102, the audio sensor 106, the IMU 108, and/or one or more other components such as a GNSS/GPS receiver, a radar, a wireless interface, etc. The predictor 120 can use the outputs from the machine learning engine 122 to predict camera events. For example, the predictor 120 can use inertial sensor data (e.g., from IMU 108) indicating that the electronic device 100 has been picked up by a user (which can suggest the user may use the electronic device 100 to capture an image/video), based on the output of a machine learning classifier (e.g., machine learning engine 122) trained on positive and negative examples of inertial sensing data. In some examples, the predictor 120 can use inertial sensor data (e.g., from IMU 108) indicating that the electronic device 100 is being held in a motion/position commonly used when taking a picture/video, based on the output of a machine learning classifier (e.g., machine learning engine 122) trained on positive and negative examples of inertial sensing data.

In some examples, the predictor 120 can use audio sensor data (e.g., from audio sensor 106) indicating that the electronic device 100 is in a crowded area (e.g., a concert, a sports event, a party, a play, a wedding, etc.) or indicating an utterance associated with taking an image/video, based on the output of a machine learning classifier (e.g., machine learning engine 122) trained on positive and negative examples of audio sensor data. In other examples, the predictor 120 can use GNSS/location data indicating that the electronic device 100 is in a commonly-photographed area (e.g., a landmark, a stage, etc.), based on a set of location-tagged photos.

In some cases, the predictor 120 can use camera data from a lower-power camera (e.g., the image sensor 102) based on the output of a machine learning classifier (e.g., machine learning engine 122) trained on positive and negative examples of camera data (e.g., images). In some examples, the camera data can indicate that a group of people is gathering (e.g., as if preparing for a group picture), that a user or group of people is smiling or posing (e.g., as if posing for a picture), a presence of a commonly-photographed scene (e.g., a sunset, beach, animal, landmark, landscape, etc.), a presence of a commonly-scanned pattern (e.g., a QR code), a presence of a gesture (e.g., waving a hand, pointing a finger, etc.), that a commonly-photographed activity is taking place (e.g., a sports competition, a show, an act, etc.), etc. In some cases, the predictor 120 can use any combination of camera data, audio sensor data, GNSS/location data, inertial sensor data, etc.

In some cases, the predictor 120 can track a use of a camera device (e.g., image sensor 102, image sensor 104) and use camera usage statistics when predicting a camera event. For example, if the camera usage statistics indicate that a user of the electronic device 100 often connects the image sensor 104 of the electronic device 100 to a telescope to capture astrophotography images, the predictor 120 can use such camera usage statistics to predict a use of the image sensor 104 when image data from the image sensor 102 indicates that the electronic device 100 is near or connected/connecting to a telescope. As another example, if the audio sensor data indicates that the electronic device 100 is often in noisy areas and the camera usage statistics indicate that the user often captures images/video in the presence of certain types of noises, the predictor 120 can use the camera usage statistics to predict a use of the image sensor 104 when audio sensor data indicates that the electronic device 100 is around those types of noises but not when the audio sensor data indicates that the electronic device 100 is around other types of noises.

In some examples, the predictor 120 can monitor various types of events to predict camera events. Non-limiting examples of events can include face detection, scene detection (e.g., sunset, room, landmark, landscape, concert, etc.), human group detection, animal/pet detection, pattern (e.g., QR code, etc.) detection, document detection, text detection, object detection, gesture detection (e.g., smile detection, emotion detection, hand waving, etc.), pose detection, noise detection, location detection, motion detection, activity detection, among others.

The components shown in FIG. 1 with respect to the electronic device 100 are illustrative examples provided for explanation purposes. In other examples, the electronic device 100 can include more or less components than those shown in FIG. 1. While the electronic device 100 is shown to include certain components, one of ordinary skill will appreciate that the electronic device 100 can include more or fewer components than those shown in FIG. 1. For example, the electronic device 100 can include, in some instances, one or more memory devices (e.g., RAM, ROM, cache, and/or the like), one or more networking interfaces (e.g., wired and/or wireless communications interfaces and the like), one or more display devices, caches, storage devices, and/or other hardware or processing devices that are not shown in FIG. 1. An illustrative example of a computing device and/or hardware components that can be implemented with the electronic device 100 are described below with respect to FIG. 7.

Figure 2A:
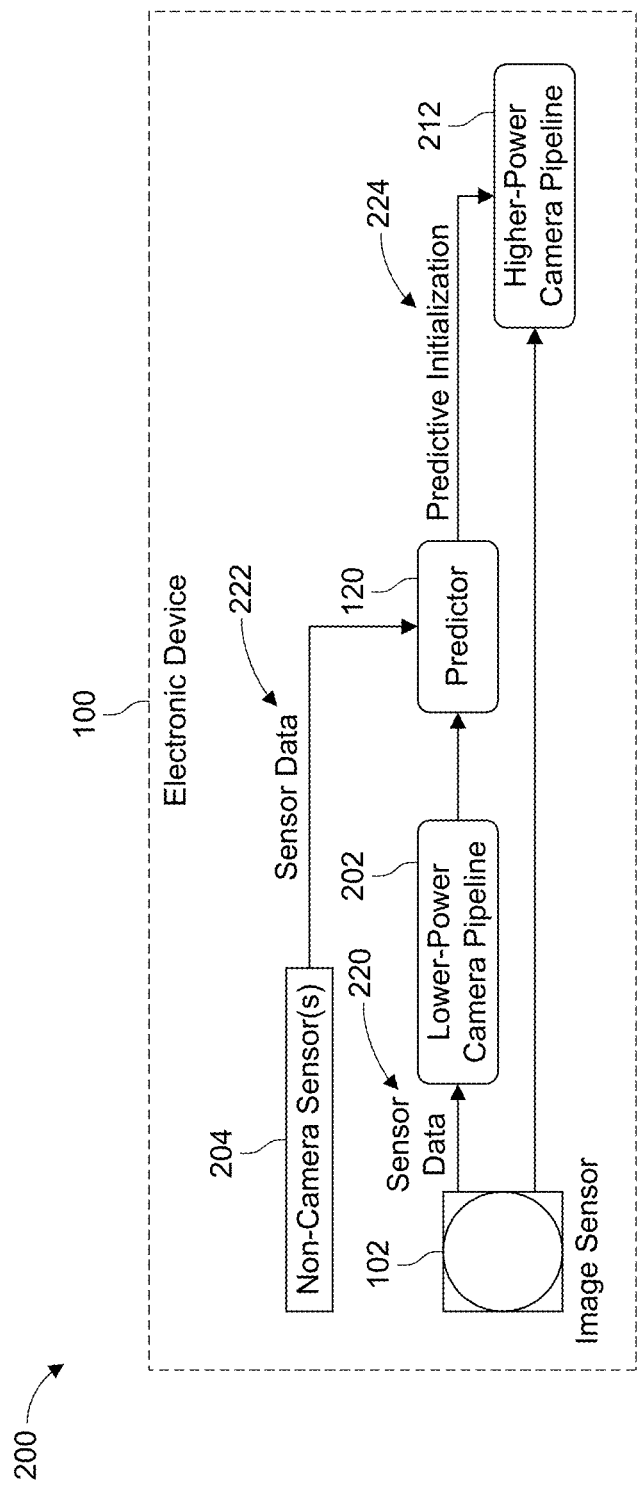
FIG. 2A and FIG. 2B are diagrams illustrating example system processes for predictive camera initialization, in accordance with some examples of the present disclosure.

FIG. 2A is a diagram illustrating an example system process 200 for predictive camera initialization. In this example, the image sensor 102 represents a lower-power camera. The image sensor 102 captures image data of a scene and provides sensor data 220 including the captured image data to the lower-power camera pipeline 202 for processing. The lower-power camera pipeline 202 can include image processing operations and/or hardware used to process the sensor data 220 including the image data captured by the image sensor 102. In this example, the lower-power camera pipeline 202 includes image sensor 102.

In some examples, the lower-power camera pipeline 202 includes pre-processing (e.g., image resizing, denoising, segmentation, smoothing edges, color correction/conversion, debayering, scaling, gamma correction, etc.). In some cases, the lower-power camera pipeline 202 can include one or more image post-processing operations. In some examples, the lower-power camera pipeline 202 can invoke/include lower-power hardware, settings, and/or processing such as, for example, lower/reduced resolution, lower/reduced framerate, lower-power sensor, on-chip SRAM (e.g., rather than DRAM), island voltage rails, ring oscillators for clock sources (e.g., rather than PLLs), a lower/reduced number of image sensors, etc.

The lower-power camera pipeline 202 can output the processed sensor data (e.g., the processed image data from the sensor data 220) to the predictor 120. The predictor 120 can use the sensor data from the lower-power camera pipeline 202 to predict a camera event based on an event captured and detected in the sensor data (e.g., the image data in the sensor data 220 from the image sensor 102). In some examples, the predictor 120 can also optionally use sensor data 222 from a non-camera sensor 204 to predict the camera event. The non-camera sensor 204 can include or represent one or more sensors/devices such as, for example, an audio sensor (e.g., audio sensor 106), an IMU (e.g., IMU 108), a GNSS/GPS receiver, and/or any other sensor (e.g., radar, LIDAR, pressure sensor, etc.). The sensor data 222 can include inertial sensor measurements (e.g., acceleration, velocity, angular rate, orientation, heading, etc.), acoustic data (e.g., noise/sound, speech, an utterance, a voice, a tone, a pitch, a sound level, a pattern of noise/sound, ultrasound, infrasound, etc.), location measurements, elevation measurements, distance measurements, any other sensor data, and/or any combination thereof.

The event captured in the sensor data (e.g., sensor data 220 and/or sensor data 222) can include, for example and without limitation, an object detected in an image, a face detected in an image, a scene (e.g., sunset, room, landmark, landscape, concert, etc.) detected in an image, a group of people detected in an image, an animal detected in an image, a pattern (e.g., QR code, etc.) detected in an image, a document detected in an image, text detected in an image, a gesture (e.g., smile detection, emotion detection, hand waving, etc.) detected in an image, a pose detected in an image, acoustic data (e.g., a noise/sound, an utterance or speech, a pattern of sound/noise, a voice, a tone, a pitch, certain ultrasound, certain infrasound, a sound level, etc.), captured in audio sensor data, a measured location, motion detection, activity detection, among other events (e.g., detected/measured objects, activities, movements, etc.).

The camera event being predicted by the predictor 120 can include one or more events associated with a user interaction with and/or use of a higher-power camera (e.g., image sensor 104) and/or a camera application. For example, the camera event being predicted can include a user input to open a camera application from which a user can obtain a preview and/or capture an image/video, a user input to trigger a capture an image/video, a hot key or shortcut pressed by a user on the electronic device 100 to trigger capture an image/video, etc. For example, the prediction of a camera event can include predicting that a user of the electronic device 100 is going to use the electronic device 100 to take a picture/video (e.g., via a camera application that triggers the image sensor 104 or via selection/activation of a hot key or shortcut that triggers the image sensor 104 to capture an image/video) or is going to open a camera application to view a preview feed and/or trigger the image sensor 104.

The predictor 120 can detect the event captured in the sensor data (e.g., sensor data 220, sensor data 222) and determine whether the detected event is commonly observed before (immediately before, within a threshold period of time before, within a number of events/actions before, etc.) a camera event(s) (e.g., the detected event has led to or preceded a camera event with at least a threshold frequency, the detected event is estimated to have a threshold likelihood of leading to or preceding a camera event, and/or the detected event has a threshold number of occurrences that have previously lead to or preceded a camera event) and/or the detected event indicates that a camera event is likely (e.g., within a threshold likelihood) to follow the detected event (e.g., immediately after the detected event, within a period of time after the detected event, within a number of events/actions after the detected event, etc.). In some examples, the predictor 120 can predict the camera event based on the detected event and an event prior probability, event statistics (e.g., detected event statistics, camera event statistics, statistical correlation/causalities of detected events and camera events, etc.), a user input(s) providing one or more preferences and/or configurations of detected events selected to trigger a camera event prediction, a prediction model, camera use analytics, and/or any combination thereof.

In some cases, the predictor 120 can implement a machine learning classifier (e.g., machine learning engine 122) to predict camera events based on sensor data (e.g., sensor data 220, sensor data 222). In some examples, the machine learning classifier can be trained on positive and negative examples of sensor data such as, for example, image sensor data, inertial sensor data, audio sensor data, GNSS/GPS/location data, other sensor data, and/or any combination thereof.

If the predictor 120 determines that the detected event is commonly observed before a camera event(s) (e.g., the detected event has led to or preceded a camera event with at least a threshold frequency, the detected event is estimated to have a threshold likelihood of leading to or preceding a camera event, and/or the detected event has a threshold number of occurrences that have previously lead to or preceded a camera event) and/or the detected event indicates that a camera event is likely (e.g., within a threshold likelihood) to follow the detected event, the predictor 120 can generate a positive camera event prediction result (e.g., the predictor 120 can determine that a camera event is predicted to occur). Based on the positive camera event prediction result (e.g., based on the determination that the camera event is predicted to occur), the predictor 120 can trigger a predictive initialization 224 of the higher-power camera pipeline 212.

The higher-power camera pipeline 212 can include one or more operations and/or hardware used to capture images/video and/or process captured images/video. In some cases, the higher-power camera pipeline 212 can be the same as or include the lower-power camera pipeline 202 with one or more adjusted settings for producing a higher image quality, producing additional and/or more complex image effects, and/or achieving a higher processing/output performance. For example, in some cases, the higher-power camera pipeline 212 can include the lower-power camera pipeline 202 with one or more settings increasing an image resolution, increasing a framerate, utilizing full color image data (e.g., as opposed to only mono/luma data), etc. In other cases, the higher-power camera pipeline 212 can include one or more different image sensors, settings, operations, and/or hardware blocks than the lower-power camera pipeline 202.

In some examples, the lower-power camera pipeline 202 can include a lower-power image sensor (e.g., image sensor 102) and the higher-power camera pipeline 212 can include a higher-power image sensor (e.g., image sensor 104). In other examples, the lower-power camera pipeline 202 and the higher-power camera pipeline 212 can include a same image sensor(s) (e.g., image sensor 102 and/or image sensor 104). In some cases, the lower-power camera pipeline 202 and the higher-power camera pipeline 212 can include the same image sensor(s) but the higher-power camera pipeline 212 can implement the image sensor(s) with or in a higher power mode (e.g., with a higher resolution, with a higher framerate, etc.).

In some examples, the higher-power camera pipeline 212 includes one or more image pre-processing, one or more post-processing operations, and/or any other image processing operations. For example, the higher-power camera pipeline 212 can include image resizing, denoising, segmentation, smoothing edges, color correction/conversion, debayering, scaling, gamma correction, tone mapping, color sensing, sharpening, compression, demosaicing, noise reduction (e.g., chroma noise reduction, luma noise reduction, temporal noise reduction, etc.), feature extraction, feature recognition, computer vision, auto exposure, auto white balance, auto focus, depth sensing, image stabilization, sensor fusion, HDR, and/or any other operations. In some examples, the higher-power camera pipeline 212 can invoke/include higher-power hardware, settings, and/or processing such as, for example, higher/increased resolution, higher/increased framerate, higher-power image sensor (e.g., image sensor 104), DRAM use/allocation, PLLs for clock sources, a higher/increased number of image sensors, etc.

In some examples, the predictive initialization 224 can include powering up/on and/or starting/preparing one or more hardware components/devices and/or one or more operations associated with the higher-power camera pipeline 212. In some cases, the predictive initialization 224 can include powering on/up the image sensor 104 and one or more hardware blocks associated with camera processing. In some cases, the predictive initialization 224 can include bursting a processor (e.g., CPU 112) and/or memory to a higher frequency to allow reduced latency. In some cases, the predictive initialization 224 can include a pre-allocation of a memory (e.g., DRAM, etc.) for a camera application. In some cases, the predictive initialization 224 can include performing a lower-resolution image capture (e.g., via image sensor 102) to pre-converge an exposure value and/or a focus value. In some cases, the predictive initialization 224 can include any combination of operations, settings, and/or hardware blocks previously noted. In some cases, the predictive initialization 224 can start/prepare the higher-power camera pipeline 212 to capture an image/video in response to a user input and with zero latency or a reduced latency.

Figure 2B:
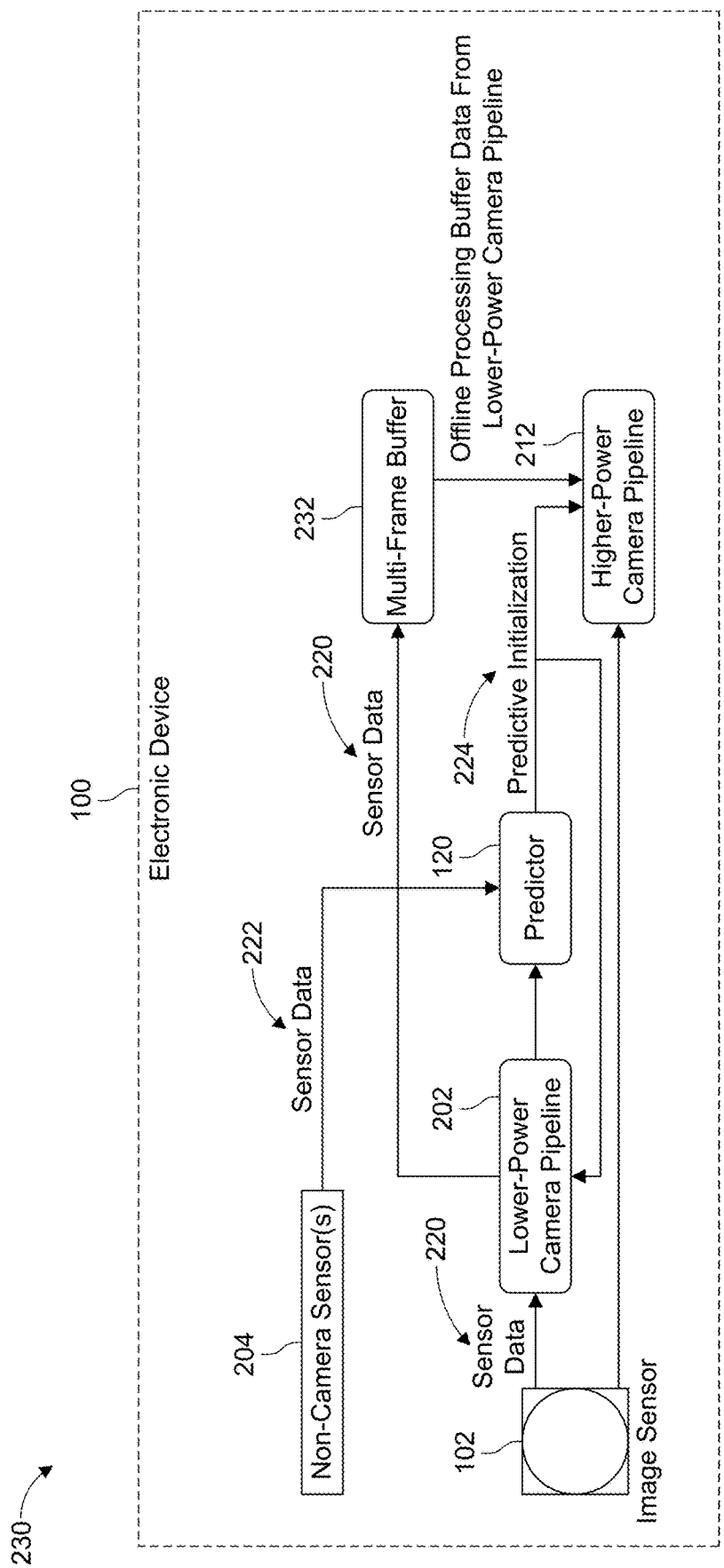

In some cases, the lower-power camera pipeline 202 can store raw sensor data from the image sensor 102 in a buffer for offline (e.g., later) processing by the higher-power camera pipeline 212. For example, FIG. 2B illustrates an example system process 230 for predictive camera initialization with offline processing of raw sensor data from the image sensor 102 by the higher-power camera pipeline 212.

In this example, in addition to leveraging the data, processing, and hardware used in the system process 200 shown in FIG. 2A, the system process 230 can implement a multi-frame buffer 232 for storing sensor data 220 from the lower-power camera pipeline 202. The lower-power camera pipeline 202 can receive the sensor data 220 from the image sensor 102 and store the sensor data 220 in the multi-frame buffer 232. In some examples, the sensor data 220 can include raw sensor data from the image sensor 102. In some cases, the multi-frame buffer 232 can act as a ZSL buffer for the higher-power camera pipeline 212.

When the predictor 120 triggers the higher-power camera pipeline 212 via the predictive initialization 224, the higher-power camera pipeline 212 can retrieve the sensor data 220 from the multi-frame buffer 232 for processing. The sensor data 220 can provide the higher-power camera pipeline 212 image data captured before and/or while the higher-power camera pipeline 212 is initialized, which the higher-power camera pipeline 212 can leverage to reduce an image/video capturing latency and/or improve a processing, quality, and/or performance of the captured image/video.

In some examples, the lower-power camera pipeline 202 may not be capable of processing images with a quality as high as those processed by the higher-power camera pipeline 212. Nevertheless, the lower-power camera pipeline 202 can store raw sensor data in the multi-frame buffer 232 (or in a different memory such as a DRAM) for (later) offline processing by the higher-power camera pipeline 212. Making this raw sensor data available to the higher-power camera pipeline 212 can provide various advantages, as the lower-power camera pipeline 202 can be operational while the higher-power camera pipeline 212 is being initialized.

Once the higher-power camera pipeline 212 is fully initialized, the higher-power camera pipeline 212 can then read back and process offline the raw sensor data in the multi-frame buffer 232. In some examples, the system process 230 can reduce or even obviate completely the startup latency of the higher-power camera pipeline 212 in the final capture of the image/video performed by the higher-power camera pipeline 212 (e.g., including image sensor 104) in response to a user input.

Figure 3:
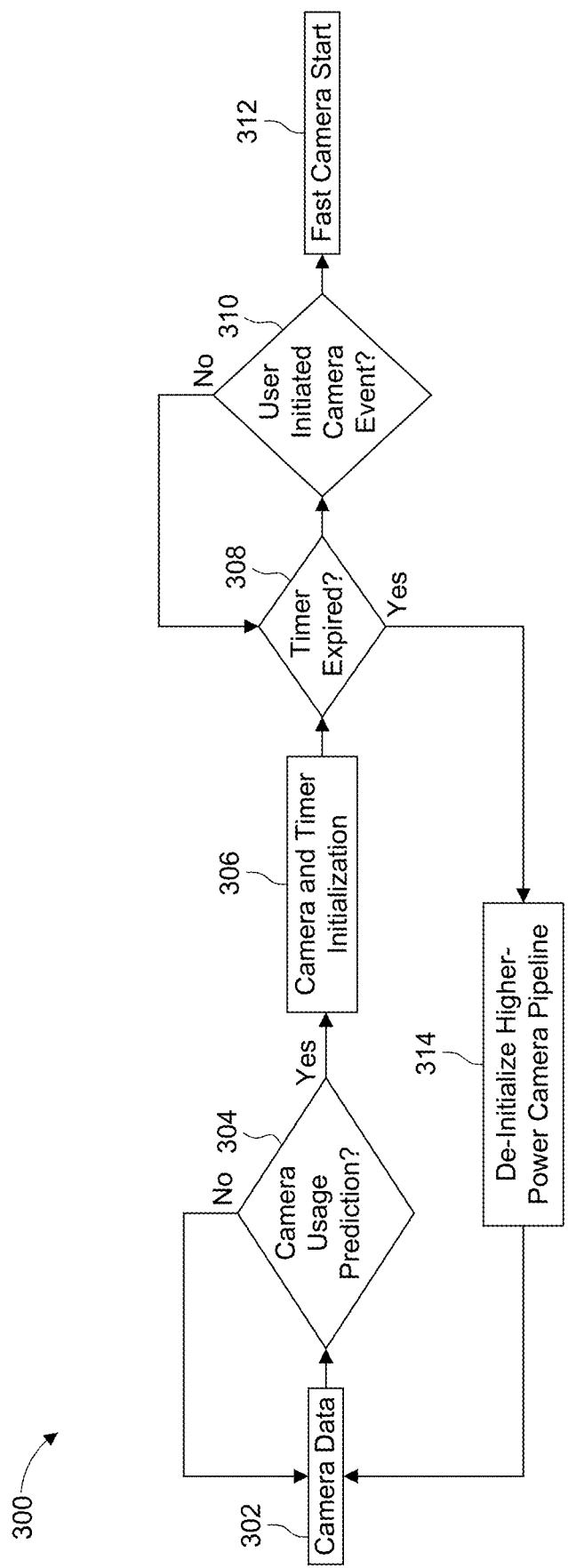
FIG. 3 is a flowchart illustrating an example process for predictive camera initialization, in accordance with some examples of the present disclosure.

FIG. 3 is a flowchart illustrating an example process 300 for predictive camera initialization. In this example, at block 304, the process 300 can include using the camera data 302 to perform a camera usage prediction (e.g., via predictor 120). The camera data 302 can include image data from a lower-power image sensor, such as image sensor 102. In some examples, the camera data 302 can be the same as sensor data 220 previously described with respect to FIG. 2A.

The camera usage prediction can include and/or represent a camera event prediction as previously described. For example, the camera usage prediction can include predicting whether a user of the electronic device 100 is going to use the electronic device 100 to take a picture/video (e.g., via a camera application that triggers a higher-power camera pipeline or via selection/activation of a hot key or shortcut that triggers the higher-power camera pipeline to capture an image/video) or is going to open a camera application to view a preview feed and/or trigger the higher-power camera pipeline.

At block 306, if the camera usage prediction yields a predicted camera event (e.g., the predictor 120 predicts that a user will attempt (e.g., via a user input) to trigger an image/video capture and/or use the camera application to view a preview feed and/or trigger the image/video capture), the process 300 can include initializing (e.g., via the predictor 120) the higher-power camera pipeline (e.g., higher-power camera pipeline 212) and a configurable timer. The configurable timer can provide a time limit for the user to trigger an image/video capture and/or initiate/use the camera application before the initialized camera pipeline is de-initialized to save power (e.g., from continuing to run the higher-power camera pipeline when the higher-power camera pipeline is not needed or being used).

At block 308, the process 300 can include determining whether the configurable timer has expired. At block 314, if the configurable timer has expired, the process 300 can include de-initializing (e.g., powering down, disabling, stopping, turning off) the higher-power camera pipeline (e.g., via the predictor 120).

If the configurable timer has not expired, the higher-power camera pipeline can remain initialized. At block 310, the process 300 can include determining (e.g., via the predictor 120) whether a user-initiated camera event has occurred. The user-initiated camera event can include a user input to trigger an image/video capture by the higher-power camera pipeline and/or to use a camera application to access a preview feed and/or trigger an image/video capture by the higher-power camera pipeline. For example, in some cases, the user-initiated camera event can include a user selection of a hot key or shortcut to trigger an image/video capture. In other cases, the user-initiated camera event can include a voice command from a user requesting the electronic device 100 to trigger the higher-power camera pipeline to capture an image/video. In other cases, the user-initiated camera event can include a user input received via a camera application to trigger the camera application (and the higher-power camera pipeline) to initiate/perform an image/video capture.

If the process 300 determines that the user-initiated camera event has not occurred (e.g., if the user-initiated camera event is not detected), the process 300 can return to block 308 to determine if the configurable timer has expired. The process 300 can maintain the higher-power camera pipeline initialized if the configurable timer has not expired or de-initialize the higher-power camera pipeline if the configurable timer has expired (e.g., as described with respect to block 314).

If the process 300 determines that the user-initiated camera event has occurred (e.g., if the user-initiated camera event is detected), at block 312, the process 300 can include performing a fast camera start. The fast camera start can include triggering the already initialized higher-power camera pipeline to capture an image/video in response to the user-initiated camera event. Since the higher-power camera pipeline is already initialized, the fast camera start can be performed without a latency (or with reduced/minimal latency) from the time of the user-initiated camera event. For example, in response to the user-initiated camera event, the higher-power camera pipeline can capture an image/video without any latency (or with a reduced/minimal latency) as the higher-power camera pipeline is already initialized.

Figure 4:
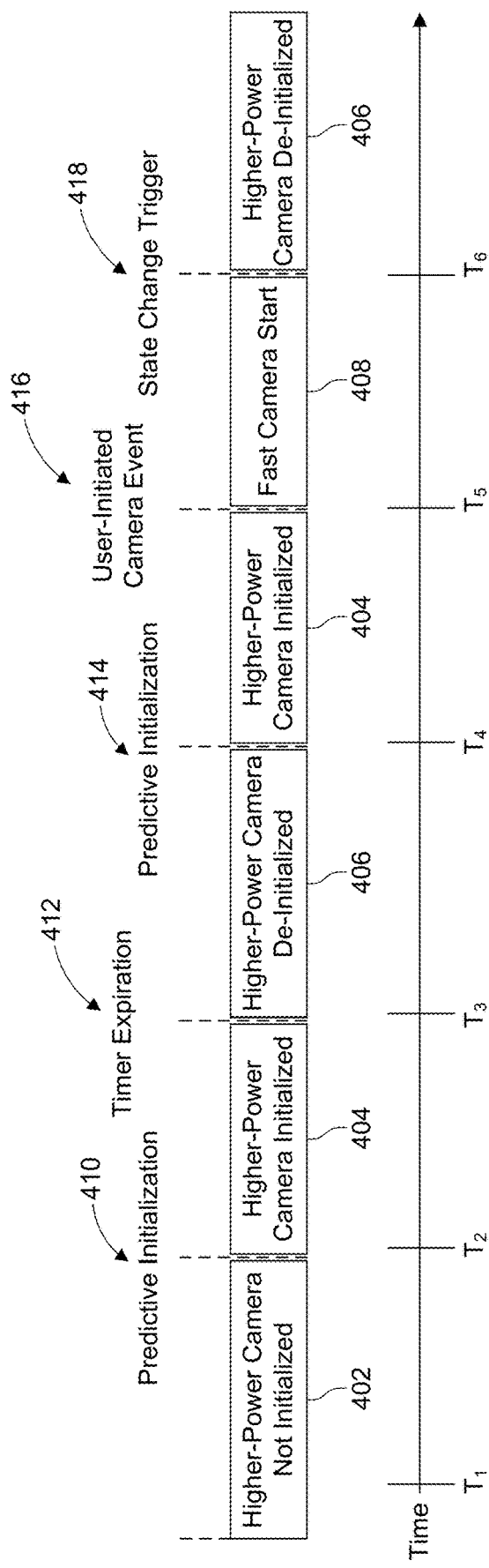
FIG. 4 is a diagram illustrating example camera initialization states adjusted at different times based on certain stimuli, in accordance with some examples of the present disclosure.

FIG. 4 is a diagram illustrating example camera initialization states modified/adjusted at different times based on certain stimuli such as, for example, a predictive initialization, a timer expiration, and/or a state change trigger. In this example, the higher-power camera pipeline (e.g., higher-power camera pipeline 212) is in a non-initialized state 402 at time $t_1$.

At time $t_2$, the predictor 120 triggers a predictive initialization 410 as previously described with respect to FIGS. 2A, 2B, and 3. Based on the predictive initialization 410, the higher-power camera pipeline changes from the non-initialized state 402 to an initialized state 404.

At time $t_3$, the predictor (e.g., predictor 120) detects a timer expiration 412 and triggers a camera de-initialization. Based on the camera de-initialization, the higher-power camera pipeline changes from the initialized state 404 to a de-initialized state 406. In some examples, the de-initialized state 406 can be the same as the non-initialized state 402. In some examples, the de-initialized state 406 can be a state where a power mode of the higher-power camera pipeline is reduced to a lower-power mode.

At time $t_4$, the predictor triggers another predictive initialization 414. Based on the predictive initialization 414, the higher-power camera pipeline changes from the de-initialized state 406 back to the initialized state 404.

At time $t_5$, a user-initiated camera event 416 can trigger a fast camera start 408, such as the fast camera start described with respect to FIG. 3. In the fast camera start 408, the higher-power camera pipeline can capture an image/video without latency (or with a reduced/minimal latency) in response to the user-initiated camera event 416.

At time $t_6$, the predictor detects a state change trigger 418 configured to change a state of the higher-power camera pipeline from an initialized state (initialized state 404) to the de-initialized state 406. In some examples, the state change trigger 418 can include an expiration of a timer, such as the timer expiration 412. In some examples, the state change trigger 418 can be based on a user input from a user of the electronic device 100. For example, the state change trigger 418 can be based on a user input (e.g., via a user interface, via a spoken command, via one or more buttons or keys, etc.) for closing the camera application, powering down/off the higher-power camera pipeline, or triggering a de-initialization of the higher-power camera pipeline.

Figure 5:
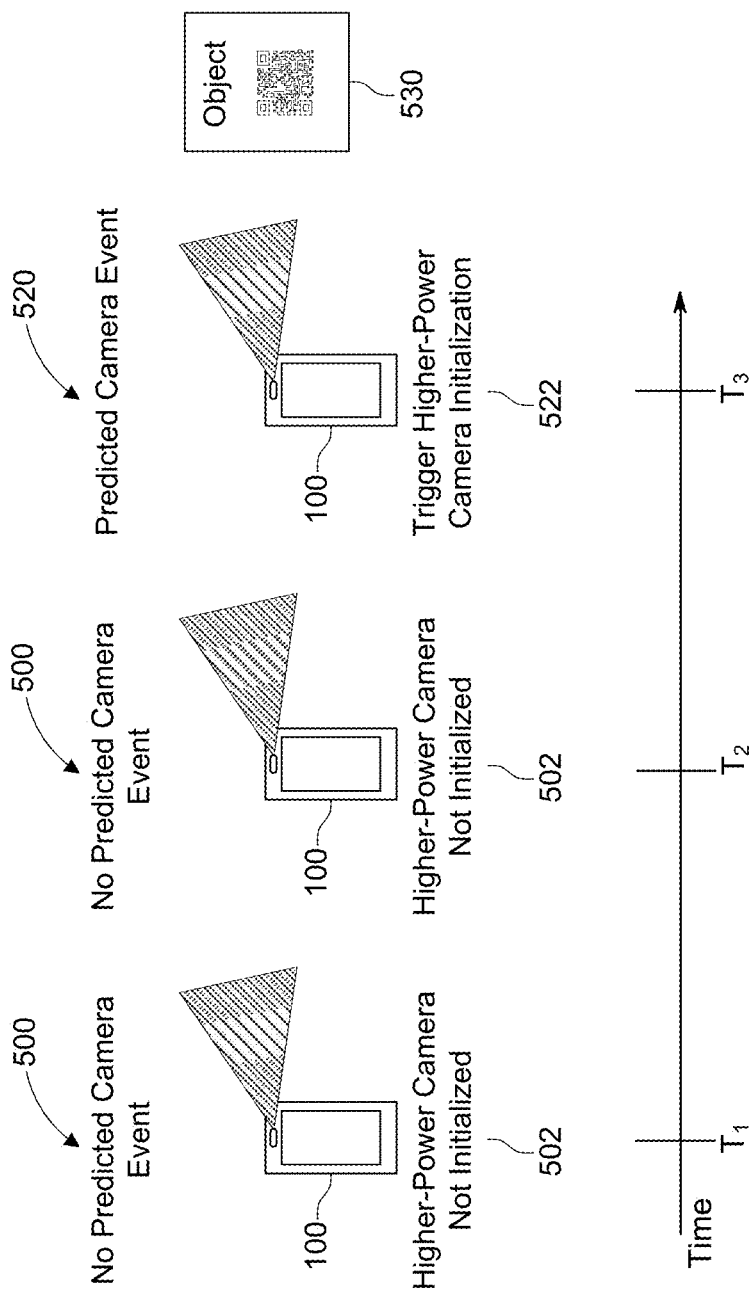
FIG. 5 is a diagram illustrating an example of different initialization states implemented based on different predictive camera event determinations, in accordance with some examples of the present disclosure.

FIG. 5 is a diagram illustrating an example of different initialization states implemented based on different predictive camera event determinations. In this example, the higher-power camera pipeline of the electronic device 100 is in a non-initialized state 502 while there is no camera event prediction 500.

Subsequently, the electronic device 100 detects (e.g., via a lower-power camera sensor such as image sensor 102) an object 530 in a scene of the electronic device 100. Based on the detection of the object 530, the predictor (e.g., predictor 120) can determine a camera event prediction 520. The camera event prediction 520 can predict a user-initiated camera event, as previously explained.

In some examples, the object 530 can be configured to trigger a camera event prediction. In some examples, the predictor can learn from previous examples that there is a threshold likelihood of a user-initiated event occurring after detection of the object 530. For example, the predictor can determine the camera event prediction 520 based on an output from a machine learning classifier (e.g., machine learning engine 122) indicating that a user-initiated camera event is predicted to occur after the detection of the object 530.

Based on the camera event prediction 520, the predictor can trigger (e.g., via an instruction/command) the higher-power camera pipeline to change from the non-initialized state 502 to an initialized state 522.

Figure 6:
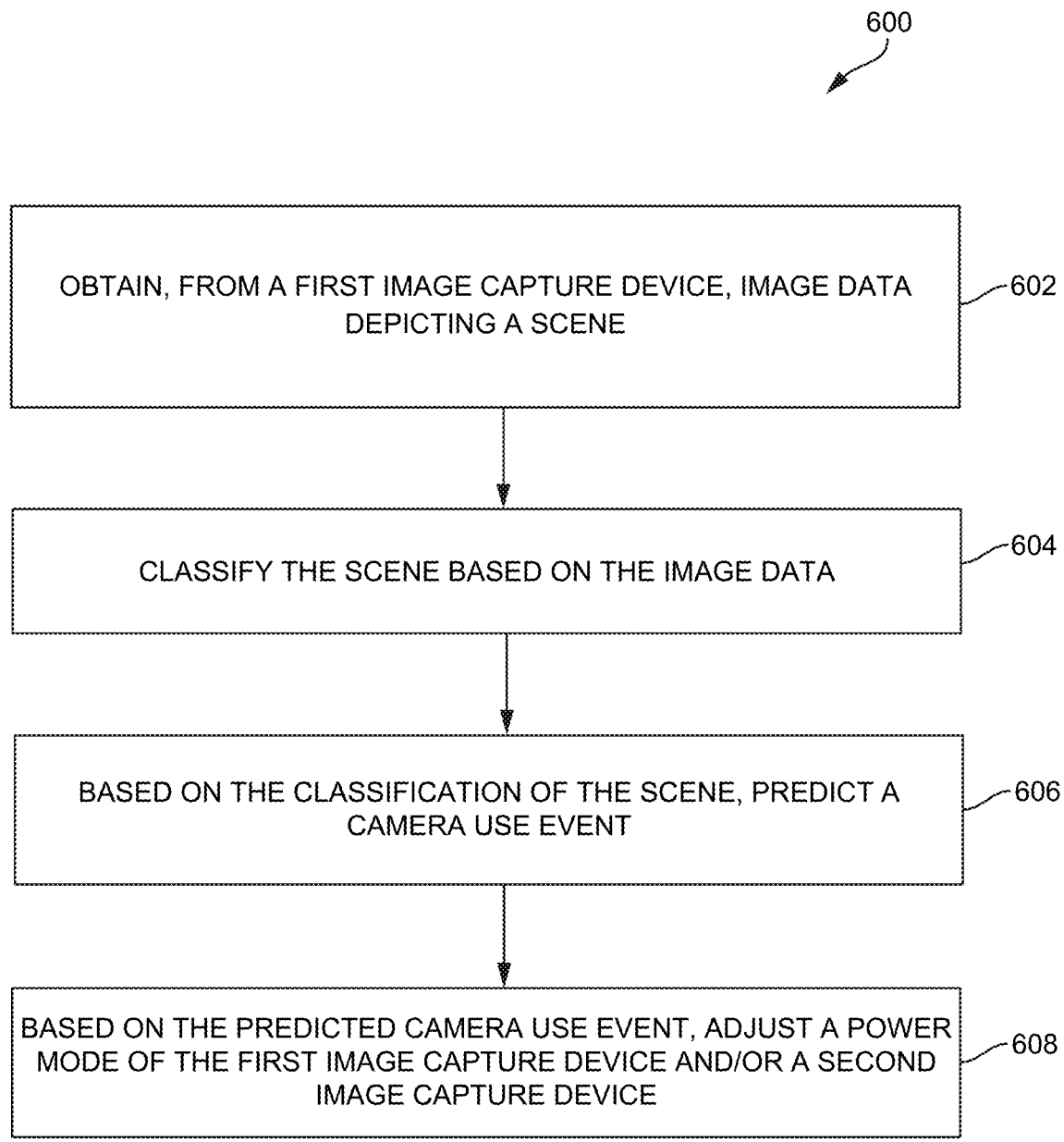
FIG. 6 is a flowchart illustrating an example process for predictive camera initialization, in accordance with some examples of the present disclosure.

FIG. 6 is a flowchart illustrating an example process 600 for predictive camera initialization. In this example, at block 602, the process 600 can include obtaining, from a first image capture device (e.g., image sensor 102), image data (e.g., sensor data 220) depicting a scene (e.g., a sunset, a landmark, a landscape, an environment, an event, etc.). In some examples, the first image capture device can automatically capture the image data without a user input for triggering the image data to be captured. In some cases, the first image capture device can capture the image data using a lower-power mode (e.g., relative to a higher power mode supported by the first image capture device and/or a second image capture device on an electronic device associated with the first image capture device) and/or a lower-power camera pipeline (e.g., lower-power camera pipeline 202).

At block 604, the process 600 can include classifying the scene based on the image data. In some examples, classifying the scene can include detecting an event associated with the image data (e.g., depicted in the image data). In some cases, the detected event can include the scene depicted in the image data. In some cases, the scene and/or detected event can include a particular movement of the electronic device, a position of the electronic device relative to a user associated with the electronic device, a crowd of people detected in the image data, a gesture associated with one or more users, a pattern (e.g., a QR code, a link, etc.) displayed on an object, and/or a position of a group of people relative to each other.

In some cases, the scene can be classified using a machine learning algorithm or an image processing algorithm.

At block 606, the process 600 can include predicting, based on the classification of the scene, a camera use event. In some examples, the camera use event can include a user input configured to trigger an electronic device (e.g., electronic device 100) associated with the first image capture device to capture additional image data.

In some cases, the camera use event can be detected using a machine learning classifier trained on positive and negative examples of image data, such as positive and negative examples of image data capturing the same type of scene as the classified scene.

At block 608, the process 600 can include adjusting, based on the predicted camera use event, a power mode of the first image capture device and/or a second image capture device (e.g., image sensor 104). In some examples, the second image capture device includes a higher-power camera device relative to the first image capture device. For example, the second image capture device can support a power mode that consumes more power than a power mode supported by the first image capture device. In some cases, the higher-power camera device can include a higher resolution than the first image capture device, a higher framerate than the first image capture device, a higher number of image sensors than the first image capture device, and/or a first image sensor that supports a higher-power mode than a second image sensor associated with the first image capture device.

In some cases, the second image capture device is associated with (e.g., uses and/or is part of) a higher-power camera pipeline (e.g., higher-power camera pipeline 212) relative to a lower-power camera pipeline (e.g., lower-power camera pipeline 202) associated with the first image capture device. In some examples, the higher-power camera pipeline includes more image processing capabilities than the lower-power camera pipeline and/or one or more hardware components having a higher processing performance than the lower-power camera pipeline. For example, in some cases, the second image capture device is associated with a first camera pipeline that consumes more power than a second camera pipeline associated with the first image capture device. In some cases, the first camera pipeline includes more image processing capabilities than the second camera pipeline and/or one or more hardware components having a higher processing performance than the second camera pipeline.

In some examples, adjusting the power mode of at least one of the first image capture device and the second image capture device can include initializing the second image capture device. In some examples, the second image capture device is initialized in a power mode (e.g., a higher-power mode) that consumes more power than a respective power mode associated with the first image capture device (e.g., than a respective power mode of the first image capture device used to capture the image data). In some cases, initializing the second image capture device can include increasing the power mode of the second image capture device.

In some aspects, the process 600 can include capturing additional image data using the second image capture device in a power mode that consumes more power than a respective power mode of the first image capture device used to capture the image data. In some examples, the power mode of the second image capture device can include a higher resolution than a resolution associated with the respective power mode of the first image capture device used to capture the image data, a higher framerate than a framerate associated with the respective power mode of the first image capture device, a higher number of image sensors than a number of image sensors associated with the respective power mode of the first image capture device, and/or a first image sensor that supports a particular power mode that consumes more power than a different power mode supported by a second image sensor associated with the first image capture device.

In some cases, initializing the second image capture device can include increasing the power mode of the second image capture device. In some examples, increasing the power mode of the second image capture device can include increasing a power of the second image capture device and/or one or more hardware components associated with a camera pipeline of the second image capture device.

In some aspects, the process 600 can include storing the image data from the first image capture device in a buffer (e.g., multi-frame buffer 232); and processing, via a camera pipeline (e.g., higher-power camera pipeline 212) associated with the second image capture device, at least the portion of the image data stored in the buffer. In some cases, at least the portion of the image data is stored in the buffer during the initializing of the second image capture device and/or before the initializing of the second image capture device completes. In some cases, at least the portion of the image data is processed after the second image capture device is initialized.

In some aspects, adjusting the power mode of at least one of the first image capture device and the second image capture device includes increasing a frequency of at least one of a processor associated with a camera pipeline of the second image capture device and/or a memory associated with the camera pipeline (e.g., bursting the processor and/or the memory).

In some aspects, adjusting the power mode of at least one of the first image capture device and the second image capture device includes pre-allocating memory to a camera application associated with the second image capture device.

In some aspects, the process 600 includes pre-converging, based on one or more images from the first image capture device, an exposure value and/or a focus value.

In some aspects, the process 600 includes obtaining location data indicating a location of the electronic device associated with the first image capture device and/or sensor data from one or more sensors associated with the electronic device; and classifying the scene based on the image data and at least one of the location data, the audio data, and/or the sensor data. In some examples, the additional camera use event can include an additional user input configured to trigger the electronic device to capture further image data. In some examples, the sensor data includes a motion measurement indicating motion associated with the electronic device, audio data captured by the one or more sensors, and/or position measurements indicating a position of the electronic device.

In some cases, the predicted camera use event can include a user input configured to trigger the electronic device to capture additional image data.

In some cases, predicting the additional camera use event can include detecting an additional event based on the location data, the audio data, and/or the sensor data. In some cases, the additional camera use event is predicted further based on the additional event. In some examples, the additional event can include one or more sounds in the audio data, a particular movement of the electronic device, and/or a particular pose of the electronic device.

In some aspects, adjusting the power mode of at least one of the first image capture device and the second image capture device includes determining one or more initialization settings associated with an initialization of the second image capture device, and initializing the second image capture device according to the one or more initialization settings. In some examples, the one or more initialization settings are determined based on a type of scene associated with the classified scene. For example, the initialization settings can include an HDR mode if the scene includes a certain scene (e.g., a sunset, a landscape, etc.) and non-HDR mode if the scene instead includes a user smile.

In some aspects, adjusting the power mode of at least one of the first image capture device and the second image capture device includes turning on or implementing a flood illuminator, a depth sensor device, a dual image capture device system, a structured light system, a time-of-flight system, an audio algorithm, a location service, and/or a different camera pipeline than a camera pipeline associated with the first image capture device.

In some aspects, the process 600 can include initializing, in response to classifying the scene, a timer associated with an expiration value; determining that a value of the timer reached the expiration value prior to an occurrence of the predicted camera use event; and based on the value of the timer reaching the expiration value prior to the occurrence of the predicted camera use event, reducing the power mode of the second image capture device. In some examples, reducing the power mode can include turning off the second image capture device and/or reducing one or more power settings associated with the second image capture device and/or a camera pipeline associated with the second image capture device. In some cases, the expiration value can vary based on the type of classified scene. For example, if the scene includes a group of people gathering in a manner estimated to indicate the group is preparing to take a group picture, the expiration value can be increased (relative to the expiration value in other types of scenes) to give the group more time to gather and adjust for the group picture.

In some aspects, adjusting the power mode of at least one of the first image capture device and the second image capture device can include decreasing the power mode of the first image capture device. In some cases, decreasing the power mode of the first image capture device can include at least one of decreasing a power of at least one of the first image capture device and one or more hardware components associated with a camera pipeline of the first image capture device.

In some aspects, adjusting the power mode of at least one of the first image capture device and the second image capture device can include increase the power mode of the first image capture device. In some cases, increasing the power mode of the first image capture device can include at least one of increasing a power of at least one of the first image capture device and one or more hardware components associated with a camera pipeline of the first image capture device.

In some examples, the process 600 may be performed by one or more computing devices or apparatuses. In one illustrative example, the process 600 can be performed by the electronic device 100 shown in FIG. 1. In some examples, the process 600 can be performed by one or more computing devices with the computing device architecture 700 shown in FIG. 7. In some cases, such a computing device or apparatus may include a processor, microprocessor, microcomputer, or other component of a device that is configured to carry out the steps of the process 600. In some examples, such computing device or apparatus may include one or more sensors configured to capture image data and/or other sensor measurements. For example, the computing device can include a smartphone, a head-mounted display, a mobile device, or other suitable device. In some examples, such computing device or apparatus may include a camera configured to capture one or more images or videos. In some cases, such computing device may include a display for displaying images. In some examples, the one or more sensors and/or camera are separate from the computing device, in which case the computing device receives the sensed data. Such computing device may further include a network interface configured to communicate data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein. The computing device may further include a display (as an example of the output device or in addition to the output device), a network interface configured to communicate and/or receive the data, any combination thereof, and/or other component(s). The network interface may be configured to communicate and/or receive Internet Protocol (IP) based data or other type of data.

The process 600 is illustrated as logical flow diagrams, the operations of which represent sequences of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 600 may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 7:
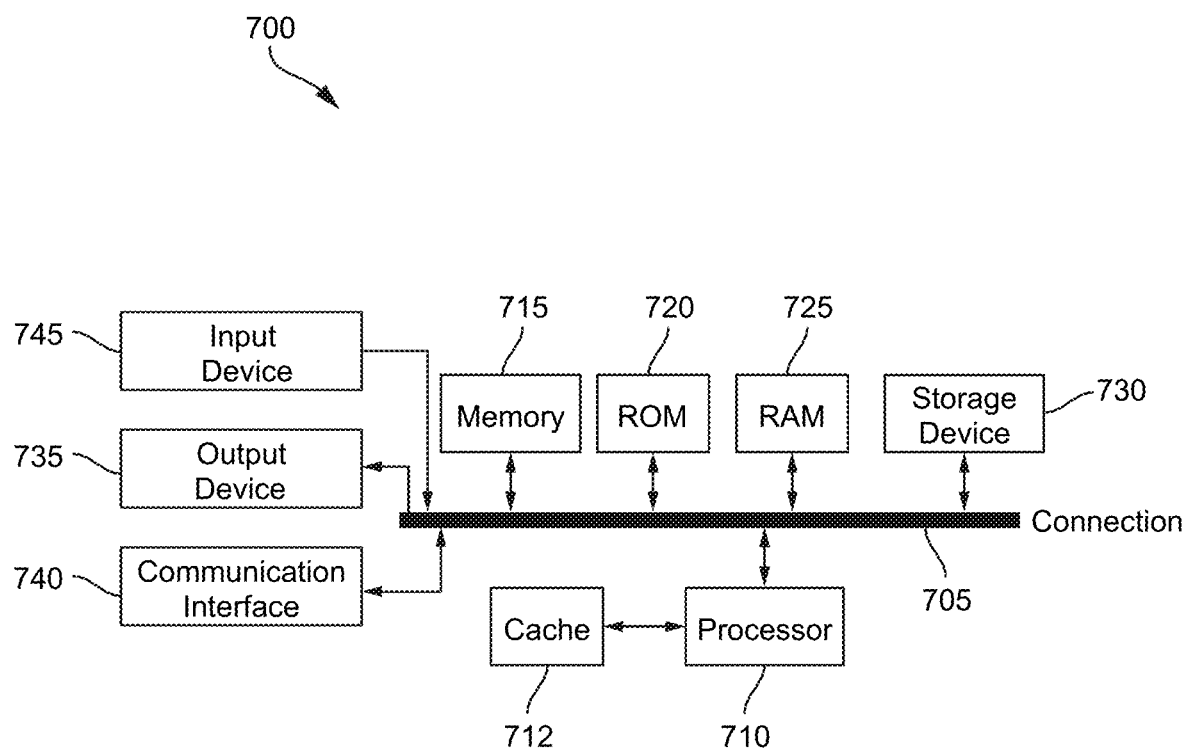
FIG. 7 illustrates an example computing device architecture, in accordance with some examples of the present disclosure.

FIG. 7 illustrates an example computing device architecture 700 of an example computing device which can implement various techniques described herein. For example, the computing device architecture 700 can implement at least some portions of the electronic device 100 shown in FIG. 1. The components of the computing device architecture 700 are shown in electrical communication with each other using a connection 705, such as a bus. The example computing device architecture 700 includes a processing unit (CPU or processor) 710 and a computing device connection 705 that couples various computing device components including the computing device memory 715, such as read only memory (ROM) 720 and random access memory (RAM) 725, to the processor 710.

The computing device architecture 700 can include a cache of high-speed memory connected directly with, in close proximity to, or integrated as part of the processor 710. The computing device architecture 700 can copy data from the memory 715 and/or the storage device 730 to the cache 712 for quick access by the processor 710. In this way, the cache can provide a performance boost that avoids processor 710 delays while waiting for data. These and other modules can control or be configured to control the processor 710 to perform various actions. Other computing device memory 715 may be available for use as well. The memory 715 can include multiple different types of memory with different performance characteristics. The processor 710 can include any general-purpose processor and a hardware or software service stored in storage device 730 and configured to control the processor 710 as well as a special-purpose processor where software instructions are incorporated into the processor design. The processor 710 may be a self-contained system, containing multiple cores or processors, a bus, memory controller, cache, etc. A multi-core processor may be symmetric or asymmetric.

To enable user interaction with the computing device architecture 700, an input device 745 can represent any number of input mechanisms, such as a microphone for speech, a touch-sensitive screen for gesture or graphical input, keyboard, mouse, motion input, speech and so forth. An output device 735 can also be one or more of a number of output mechanisms known to those of skill in the art, such as a display, projector, television, speaker device. In some instances, multimodal computing devices can enable a user to provide multiple types of input to communicate with the computing device architecture 700. The communication interface 740 can generally govern and manage the user input and computing device output. There is no restriction on operating on any particular hardware arrangement and therefore the basic features here may easily be substituted for improved hardware or firmware arrangements as they are developed.

Storage device 730 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 725, read only memory (ROM) 720, and hybrids thereof. The storage device 730 can include software, code, firmware, etc., for controlling the processor 710. Other hardware or software modules are contemplated. The storage device 730 can be connected to the computing device connection 705. In one aspect, a hardware module that performs a particular function can include the software component stored in a computer-readable medium in connection with the necessary hardware components, such as the processor 710, connection 705, output device 735, and so forth, to carry out the function.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general-purpose computer, special purpose computer, or a processing device to perform a certain function or group of functions. Portions of computer resources used can be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language in the disclosure reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

The various illustrative logical blocks, modules, circuits, and algorithm steps described in connection with the examples disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods, algorithms, and/or operations described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general-purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

Illustrative examples of the disclosure include:

Aspect 1. An apparatus for predictive camera initialization, the apparatus comprising: memory; and one or more processors coupled to the memory, the one or more processors being configured to: obtain, from a first image capture device, image data depicting a scene; classify the scene based on the image data; based on the classification of the scene, predict a camera use event; and based on the predicted camera use event, adjust a power mode of at least one of the first image capture device and a second image capture device.

Aspect 2. The apparatus of Aspect 1, wherein, to adjust the power mode of at least one of the first image capture device and the second image capture device, the one or more processors are configured to: initialize the second image capture device, wherein the second image capture device is initialized in a power mode that consumes more power than a respective power mode of the first image capture device used to capture the image data.

Aspect 3. The apparatus of Aspect 2, wherein the one or more processors are configured to: capture additional image data using the second image capture device in the power mode that consumes more power than the respective power mode of the first image capture device, wherein the power mode is associated with at least one of a higher resolution than a resolution associated with the respective power mode of the first image capture device used to capture the image data, a higher framerate than a framerate associated with the respective power mode of the first image capture device used to capture the image data, a higher number of image sensors than a number of image sensors associated with the respective power mode of the first image capture device used to capture the image data, and a first image sensor that supports a particular power mode that consumes more power than a different power mode supported by a second image sensor associated with the first image capture device.

Aspect 4. The apparatus of any of Aspects 2 to 3, wherein the second image capture device is associated with a first camera pipeline that consumes more power than a second camera pipeline associated with the first image capture device, wherein the first camera pipeline comprises at least one of more image processing capabilities than the second camera pipeline and one or more hardware components having a higher processing performance than the second camera pipeline.

Aspect 5. The apparatus of any of Aspects 2 to 4, wherein, to initialize the second image capture device, the one or more processors are configured to increase the power mode of the second image capture device.

Aspect 6. The apparatus of Aspect 5, wherein, to increase the power mode of the second image capture device, the one or more processors are configured to: increase a power of at least one of the second image capture device and one or more hardware components associated with a camera pipeline of the second image capture device.

Aspect 7. The apparatus of any of Aspects 2 to 6, wherein the one or more processors are configured to: store the image data from the first image capture device in a buffer, wherein at least a portion of the image data is stored in the buffer at least one of during the initializing of the second image capture device and before the initializing of the second image capture device completes; and process, via a camera pipeline associated with the second image capture device, at least the portion of the image data stored in the buffer, wherein the at least the portion of the image data is processed after the second image capture device is initialized.

Aspect 8. The apparatus of any of Aspects 1 to 7, wherein, to adjust the power mode of at least one of the first image capture device and the second image capture device, the one or more processors are configured to: increase a frequency of at least one of a processor associated with a camera pipeline of the second image capture device and a memory associated with the camera pipeline.

Aspect 9. The apparatus of any of Aspects 1 to 8, wherein, to adjust the power mode of at least one of the first image capture device and the second image capture device, the one or more processors are configured to: pre-allocate memory to a camera application associated with the second image capture device.

Aspect 10. The apparatus of any of Aspects 1 to 9, wherein the one or more processors are configured to: pre-converge, based on one or more images from the first image capture device, at least one of an exposure value and a focus value.

Aspect 11. The apparatus of any of Aspects 1 to 10, wherein the one or more processors are configured to: obtain at least one of location data indicating a location of the apparatus and sensor data from one or more sensors associated with the apparatus, the sensor data comprising at least one of a motion measurement indicating motion associated with the apparatus, audio data captured by the one or more sensors, and position measurements indicating a position of the apparatus; and classify the scene based on the image data and at least one of the location data, the audio data, and the sensor data.

Aspect 12. The apparatus of any of Aspects 1 to 11, wherein the predicted camera use event comprises a user input configured to trigger the apparatus to capture additional image data.

Aspect 13. The apparatus of any of Aspects 1 to 12, wherein, to classify the scene, the one or more processors are configured to detect an event associated with the image data, wherein the event comprises at least one of the scene depicted in the image data, a particular movement of the apparatus, a position of the apparatus relative to a user associated with the apparatus, a crowd of people detected in the image data, a gesture associated with one or more users, a pattern displayed on an object, and a position of a group of people relative to each other.

Aspect 14. The apparatus of any of Aspects 1 to 13, wherein, to adjust the power mode of at least one of the first image capture device and the second image capture device, the one or more processors are configured to: determine one or more initialization settings associated with an initialization of the second image capture device, the one or more initialization settings being based on a type of event associated with the scene; and initialize the second image capture device according to the one or more initialization settings.

Aspect 15. The apparatus of any of Aspects 1 to 14, wherein the one or more processors are configured to: in response to classifying the scene, initialize a timer associated with an expiration value; determine that a value of the timer reached the expiration value prior to an occurrence of the predicted camera use event; and based on the value of the timer reaching the expiration value prior to the occurrence of the predicted camera use event, reduce the power mode of the second image capture device, wherein reducing the power mode comprises at least one of turning off the second image capture device and reducing one or more power settings associated with at least one of the second image capture device and a camera pipeline associated with the second image capture device.

Aspect 16. The apparatus of any of Aspects 1 to 15, wherein, to adjust the power mode of the second image capture device, the one or more processors are configured to turn on or implement at least one of a flood illuminator, a depth sensor device, a dual image capture device system, a structured light system, a time-of-flight system, an audio algorithm, a location service, and a different camera pipeline than a camera pipeline associated with the first image capture device.

Aspect 17. The apparatus of any of Aspects 1 to 16, wherein, to adjust the power mode of at least one of the first image capture device and the second image capture device, the one or more processors are configured to: decrease the power mode of the first image capture device, wherein decreasing the power mode of the first image capture device comprises at least one of decreasing a power of at least one of the first image capture device and one or more hardware components associated with a camera pipeline of the first image capture device.

Aspect 18. The apparatus of any of Aspects 1 to 17, wherein, to adjust the power mode of at least one of the first image capture device and the second image capture device, the one or more processors are configured to: increase the power mode of the first image capture device, wherein increasing the power mode of the first image capture device comprises at least one of increasing a power of at least one of the first image capture device and one or more hardware components associated with a camera pipeline of the first image capture device.

Aspect 19. The apparatus of any of Aspects 1 to 18, wherein the apparatus comprises a mobile device.

Aspect 20. The apparatus of Aspect 19, wherein the apparatus comprises an extended reality device.

Aspect 21. A method for predictive camera initialization, the method comprising: obtaining, from a first image capture device, image data depicting a scene; classifying the scene based on the image data; based on the classification of the scene, predicting a camera use event; and based on the predicted camera use event, adjusting a power mode of at least one of the first image capture device and a second image capture device.

Aspect 22. The method of Aspect 21, wherein adjusting the power mode of at least one of the first image capture device and the second image capture device comprises: initializing the second image capture device, wherein the second image capture device is initialized in a power mode that consumes more power than a respective power mode of the first image capture device used to capture the image data.

Aspect 23. The method of Aspect 22, further comprising: capturing additional image data using the second image capture device in the power mode that consumes more power than the respective power mode of the first image capture device, wherein the power mode is associated with at least one of a higher resolution than a resolution associated with the respective power mode of the first image capture device used to capture the image data, a higher framerate than a framerate associated with the respective power mode of the first image capture device used to capture the image data, a higher number of image sensors than a number of image sensors associated with the respective power mode of the first image capture device used to capture the image data, and a first image sensor that supports a particular power mode that consumes more power than a different power mode supported by a second image sensor associated with the first image capture device.

Aspect 24. The method of any of Aspects 22 to 23, wherein the second image capture device is associated with a first camera pipeline that consumes more power than a second camera pipeline associated with the first image capture device, wherein the first camera pipeline comprises at least one of more image processing capabilities than the second camera pipeline and one or more hardware components having a higher processing performance than the second camera pipeline.

Aspect 25. The method of any of Aspects 22 to 24, wherein initializing the second image capture device comprises increasing the power mode of the second image capture device.

Aspect 26. The method of Aspect 25, wherein increasing the power mode of the second image capture device comprises increasing a power of at least one of the second image capture device and one or more hardware components associated with a camera pipeline of the second image capture device.

Aspect 27. The method of any of Aspects 22 to 26, further comprising: storing the image data from the first image capture device in a buffer, wherein at least a portion of the image data is stored in the buffer at least one of during the initializing of the second image capture device and before the initializing of the second image capture device completes; and processing, via a camera pipeline associated with the second image capture device, at least the portion of the image data stored in the buffer, wherein the at least the portion of the image data is processed after the second image capture device is initialized.

Aspect 28. The method of any of Aspects 21 to 27, wherein adjusting the power mode of at least one of the first image capture device and the second image capture device comprises: increasing a frequency of at least one of a processor associated with a camera pipeline of the second image capture device and a memory associated with the camera pipeline.

Aspect 29. The method of any of Aspects 21 to 28, wherein adjusting the power mode of at least one of the first image capture device and the second image capture device comprises: pre-allocating memory to a camera application associated with the second image capture device.

Aspect 30. The method of any of Aspects 21 to 29, further comprising: pre-converging, based on one or more images from the first image capture device, at least one of an exposure value and a focus value.

Aspect 31. The method of any of Aspects 21 to 30, further comprising: obtaining at least one of location data indicating a location of an electronic device associated with the first image capture device and sensor data from one or more sensors associated with the electronic device, the sensor data comprising at least one of a motion measurement indicating motion associated with the electronic device, audio data captured by the one or more sensors, and position measurements indicating a position of the electronic device; and classifying the scene based on the image data and at least one of the location data, the audio data, and the sensor data.

Aspect 32. The method of any of Aspects 21 to 31, wherein the predicted camera use event comprises a user input configured to trigger an electronic device associated with the first image capture device to capture additional image data.

Aspect 33. The method of any of Aspects 21 to 32, wherein classifying the scene comprises detecting an event associated with the image data, wherein the event comprises at least one of the scene depicted in the image data, a particular movement of an electronic device associated with the first image capture device, a position of the electronic device relative to a user associated with the electronic device, a crowd of people detected in the image data, a gesture associated with one or more users, a pattern displayed on an object, and a position of a group of people relative to each other.

Aspect 34. The method of any of Aspects 21 to 33, wherein adjusting the power mode of at least one of the first image capture device and the second image capture device comprises: determining one or more initialization settings associated with an initialization of the second image capture device, the one or more initialization settings being based on a type of event associated with the scene; and initializing the second image capture device according to the one or more initialization settings.

Aspect 35. The method of any of Aspects 21 to 34, further comprising: in response to classifying the scene, initializing a timer associated with an expiration value; determining that a value of the timer reached the expiration value prior to an occurrence of the predicted camera use event; and based on the value of the timer reaching the expiration value prior to the occurrence of the predicted camera use event, reducing the power mode of the second image capture device, wherein reducing the power mode comprises at least one of turning off the second image capture device and reducing one or more power settings associated with at least one of the second image capture device and a camera pipeline associated with the second image capture device.

Aspect 36. The method of any of Aspects 21 to 35, wherein adjusting the power mode of the second image capture device comprises turning on or implementing at least one of a flood illuminator, a depth sensor device, a dual image capture device system, a structured light system, a time-of-flight system, an audio algorithm, a location service, and a different camera pipeline than a camera pipeline associated with the first image capture device.

Aspect 37. The method of any of Aspects 21 to 36, wherein adjusting the power mode of at least one of the first image capture device and the second image capture device comprises: decreasing the power mode of the first image capture device, wherein decreasing the power mode of the first image capture device comprises at least one of decreasing a power of at least one of the first image capture device and one or more hardware components associated with a camera pipeline of the first image capture device.

Aspect 38. The method of any of Aspects 21 to 37, wherein adjusting the power mode of at least one of the first image capture device and the second image capture device comprises: increasing the power mode of the first image capture device, wherein increasing the power mode of the first image capture device comprises at least one of increasing a power of at least one of the first image capture device and one or more hardware components associated with a camera pipeline of the first image capture device.

Aspect 39. A non-transitory computer-readable medium having stored thereon instructions which, when executed by one or more processors, cause the one or more processors to perform a method according to any of Aspects 21 to 38.

Aspect 40. An apparatus comprising means for performing a method according to any of Aspects 21 to 38.

Aspect 41. The apparatus of Aspect 40, wherein the apparatus comprises a mobile device.

Aspect 42. The apparatus of Aspect 41, wherein the mobile device comprises an extended reality device.

What is claimed is:

1. An apparatus for predictive camera initialization, the apparatus comprising:
    memory; and
    one or more processors coupled to the memory, the one or more processors being configured to:
        obtain, from a first image capture device, image data depicting a scene;
        classify the scene based on the image data;
        based on the classification of the scene, predict a camera use event; and
        based on the predicted camera use event, pre-allocate the memory to a camera application associated with a second image capture device.

2. The apparatus of claim 1, wherein the one or more processors are configured to:
    initialize the second image capture device based on the pre-allocation of the memory, wherein the second image capture device is initialized in a power mode that consumes more power than a respective power mode of the first image capture device used to capture the image data.

3. The apparatus of claim 2, wherein the one or more processors are configured to:
    capture additional image data using the second image capture device in the power mode that consumes more power than the respective power mode of the first image capture device, wherein the power mode is associated with at least one of a higher resolution than a resolution associated with the respective power mode of the first image capture device used to capture the image data, a higher framerate than a framerate associated with the respective power mode of the first image capture device used to capture the image data, a higher number of image sensors than a number of image sensors associated with the respective power mode of the first image capture device used to capture the image data, or a first image sensor that supports a particular power mode that consumes more power than a different power mode supported by a second image sensor associated with the first image capture device.

4. The apparatus of claim 2, wherein the second image capture device is associated with a first camera pipeline that consumes more power than a second camera pipeline associated with the first image capture device, wherein the first camera pipeline comprises at least one of more image processing capabilities than the second camera pipeline or one or more hardware components having a higher processing performance than the second camera pipeline.

5. The apparatus of claim 2, wherein, to initialize the second image capture device, the one or more processors are configured to increase the power mode of the second image capture device.

6. The apparatus of claim 5, wherein the one or more processors are configured to:
increase a power of at least one of the second image capture device or one or more hardware components associated with a camera pipeline of the second image capture device.

7. The apparatus of claim 2, wherein the one or more processors are configured to:
store the image data from the first image capture device in a buffer, wherein at least a portion of the image data is stored in the buffer at least one of during the initializing of the second image capture device or before the initializing of the second image capture device completes; and
process, via a camera pipeline associated with the second image capture device, at least the portion of the image data stored in the buffer, wherein the at least the portion of the image data is processed after the second image capture device is initialized.

8. The apparatus of claim 1, wherein the one or more processors are configured to:
based on the predicted camera use event, increase a frequency of at least one of a processor associated with a camera pipeline of the second image capture device or the memory associated with the camera pipeline.

9. The apparatus of claim 1, wherein the one or more processors are configured to:
pre-converge, based on one or more images from the first image capture device, at least one of an exposure value or a focus value.

10. The apparatus of claim 1, wherein the one or more processors are configured to:
obtain at least one of location data indicating a location of the apparatus or sensor data from one or more sensors associated with the apparatus, the sensor data comprising at least one of a motion measurement indicating motion associated with the apparatus, audio data captured by the one or more sensors, or position measurements indicating a position of the apparatus; and
classify the scene based on the image data and at least one of the location data, the audio data, or the sensor data.

11. The apparatus of claim 1, wherein the predicted camera use event comprises a user input configured to trigger the apparatus to capture additional image data.

12. The apparatus of claim 1, wherein, to classify the scene, the one or more processors are configured to detect an event associated with the image data, wherein the event comprises at least one of the scene depicted in the image data, a particular movement of the apparatus, a position of the apparatus relative to a user associated with the apparatus, a crowd of people detected in the image data, a gesture associated with one or more users, a pattern displayed on an object, or a position of a group of people relative to each other.

13. The apparatus of claim 1, wherein the one or more processors are configured to:
based on the predicted camera use event, determine one or more initialization settings associated with an initialization of the second image capture device, the one or more initialization settings being based on a type of event associated with the scene; and
initialize the second image capture device according to the one or more initialization settings.

14. The apparatus of claim 1, wherein the one or more processors are configured to:
in response to classifying the scene, initialize a timer associated with an expiration value;
determine that a value of the timer reached the expiration value prior to an occurrence of the predicted camera use event; and
based on the value of the timer reaching the expiration value prior to the occurrence of the predicted camera use event, reduce a power mode of the second image capture device at least in part by at least one of turning off the second image capture device or reducing one or more power settings associated with at least one of the second image capture device or a camera pipeline associated with the second image capture device.

15. The apparatus of claim 1, wherein the one or more processors are configured to:
based on the predicted camera use event, turn on or implement at least one of a flood illuminator, a depth sensor device, a dual image capture device system, a structured light system, a time-of-flight system, an audio algorithm, a location service, or a different camera pipeline than a camera pipeline associated with the first image capture device.

16. The apparatus of claim 1, wherein the one or more processors are configured to:
based on the predicted camera use event, decrease a power mode of the first image capture device, wherein decreasing the power mode of the first image capture device comprises at least one of decreasing a power of at least one of the first image capture device or one or more hardware components associated with a camera pipeline of the first image capture device.

17. The apparatus of claim 1, wherein the one or more processors are further configured to:
based on the predicted camera use event, increase a power mode of the first image capture device, wherein increasing the power mode of the first image capture device comprises increasing a power of at least one of the first image capture device or one or more hardware components associated with a camera pipeline of the first image capture device.

18. The apparatus of claim 1, wherein the apparatus comprises a mobile device.

19. The apparatus of claim 18, wherein the apparatus comprises an extended reality device.

20. A method for predictive camera initialization, the method comprising:
obtaining, from a first image capture device, image data depicting a scene;
classifying the scene based on the image data;
based on the classification of the scene, predicting a camera use event; and
based on the predicted camera use event, pre-allocating memory to a camera application associated with a second image capture device.

21. The method of claim 20, further comprising:
initializing the second image capture device based on the pre-allocation of the memory, wherein the second image capture device is initialized in a power mode that consumes more power than a respective power mode of the first image capture device used to capture the image data.

22. The method of claim 21, further comprising:
capturing additional image data using the second image capture device in the power mode that consumes more power than the respective power mode of the first image capture device, wherein the power mode is associated with at least one of a higher resolution than a resolution associated with the respective power mode of the first image capture device used to capture the image data, a higher framerate than a framerate associated with the respective power mode of the first image capture device used to capture the image data, a higher number of image sensors than a number of image sensors associated with the respective power mode of the first image capture device used to capture the image data, or a first image sensor that supports a particular power mode that consumes more power than a different power mode supported by a second image sensor associated with the first image capture device.

23. The method of claim 21, wherein the second image capture device is associated with a first camera pipeline that consumes more power than a second camera pipeline associated with the first image capture device, wherein the first camera pipeline comprises at least one of more image processing capabilities than the second camera pipeline or one or more hardware components having a higher processing performance than the second camera pipeline.

24. The method of claim 21, wherein initializing the second image capture device comprises increasing the power mode of the second image capture device.

25. The method of claim 24, further comprising:
increasing a power of at least one of the second image capture device or one or more hardware components associated with a camera pipeline of the second image capture device.

26. The method of claim 21, further comprising:
storing the image data from the first image capture device in a buffer, wherein at least a portion of the image data is stored in the buffer at least one of during the initializing of the second image capture device or before the initializing of the second image capture device completes; and
processing, via a camera pipeline associated with the second image capture device, at least the portion of the image data stored in the buffer, wherein the at least the portion of the image data is processed after the second image capture device is initialized.

27. The method of claim 20, further comprising:
based on the predicted camera use event, increasing a frequency of at least one of a processor associated with a camera pipeline of the second image capture device or a memory associated with the camera pipeline.

28. The method of claim 20, further comprising:
pre-converging, based on one or more images from the first image capture device, at least one of an exposure value or a focus value.

29. The method of claim 20, further comprising:
obtaining at least one of location data indicating a location of an electronic device associated with the first image capture device or sensor data from one or more sensors associated with the electronic device, the sensor data comprising at least one of a motion measurement indicating motion associated with the electronic device, audio data captured by the one or more sensors, or position measurements indicating a position of the electronic device; and
classifying the scene based on the image data and at least one of the location data, the audio data, or the sensor data.

30. The method of claim 20, wherein the predicted camera use event comprises a user input configured to trigger an electronic device associated with the first image capture device to capture additional image data.

31. The method of claim 20, wherein classifying the scene comprises detecting an event associated with the image data, wherein the event comprises at least one of the scene depicted in the image data, a particular movement of an electronic device associated with the first image capture device, a position of the electronic device relative to a user associated with the electronic device, a crowd of people detected in the image data, a gesture associated with one or more users, a pattern displayed on an object, or a position of a group of people relative to each other.

32. The method of claim 20, further comprising:
based on the predicted camera use event, determining one or more initialization settings associated with an initialization of the second image capture device, the one or more initialization settings being based on a type of event associated with the scene; and
initializing the second image capture device according to the one or more initialization settings.

33. The method of claim 20, further comprising:
in response to classifying the scene, initializing a timer associated with an expiration value;
determining that a value of the timer reached the expiration value prior to an occurrence of the predicted camera use event; and
based on the value of the timer reaching the expiration value prior to the occurrence of the predicted camera use event, reducing a power mode of the second image capture device, wherein reducing the power mode comprises at least one of turning off the second image capture device or reducing one or more power settings associated with at least one of the second image capture device or a camera pipeline associated with the second image capture device.

34. The method of claim 20, further comprising:
based on the predicted camera use event, turning on or implementing at least one of a flood illuminator, a depth sensor device, a dual image capture device system, a structured light system, a time-of-flight system, an audio algorithm, a location service, or a different camera pipeline than a camera pipeline associated with the first image capture device.

35. The method of claim 20, further comprising:
based on the predicted camera use event, decreasing a power mode of the first image capture device, wherein decreasing the power mode of the first image capture device comprises at least one of decreasing a power of at least one of the first image capture device or one or more hardware components associated with a camera pipeline of the first image capture device.

36. The method of claim 20, further comprising:
based on the predicted camera use event, increasing a power mode of the first image capture device, wherein increasing the power mode of the first image capture device comprises increasing a power of at least one of the first image capture device or one or more hardware components associated with a camera pipeline of the first image capture device.

* * * * *